US011857006B2

(12) United States Patent
Rawat et al.

(10) Patent No.: US 11,857,006 B2
(45) Date of Patent: Jan. 2, 2024

(54) ADJUSTABLE FULL-BODY PROTECTION GEAR

(71) Applicant: CHAIRMAN, DEFENCE RESEARCH AND DEVELOPMENT ORGANISATION (DRDO), New Delhi (IN)

(72) Inventors: Shweta Rawat, Delhi (IN); Robert Lalhmunlien Varte, Delhi (IN); Inderjeet Singh, Delhi (IN); Yashmita Chaudhary, Delhi (IN); Deepika Kakkar, Delhi (IN); Usha Panjwani, Delhi (IN); Bhuvnesh Kumar, Delhi (IN)

(73) Assignee: CHAIRMAN, DEFENCE RESEARCH AND DEVELOPMENT ORGANISATION (DRDO), New Delhi (IN)

( * ) Notice: Subject to any disclaimer, the term of this patent is extended or adjusted under 35 U.S.C. 154(b) by 289 days.

(21) Appl. No.: 17/418,436

(22) PCT Filed: Dec. 26, 2019

(86) PCT No.: PCT/IN2019/050957
§ 371 (c)(1),
(2) Date: Jun. 25, 2021

(87) PCT Pub. No.: WO2020/136682
PCT Pub. Date: Jul. 2, 2020

(65) Prior Publication Data

US 2022/0047008 A1 Feb. 17, 2022
US 2022/0279873 A2 Sep. 8, 2022
US 2023/0021296 A2 Jan. 19, 2023

(30) Foreign Application Priority Data

Dec. 26, 2018 (IN) ............................ 201811049060
Dec. 27, 2018 (IN) ............................ 201811049452
Jul. 15, 2019 (IN) ............................ 201911028442

(51) Int. Cl.
*F41H 1/02* (2006.01)
*A41D 13/015* (2006.01)
(Continued)

(52) U.S. Cl.
CPC ..... *A41D 13/0153* (2013.01); *A41D 13/0518* (2013.01); *A41D 13/0525* (2013.01);
(Continued)

(58) Field of Classification Search
CPC ... F41H 1/02; A41D 13/0518; A41D 13/0525; A41D 13/06; A41D 13/08
See application file for complete search history.

(56) References Cited

U.S. PATENT DOCUMENTS 4,183,097 A * 1/1980 Mellian ..................... F41H 1/02
2/2.5
5,072,453 A 12/1991 Widder
(Continued)

FOREIGN PATENT DOCUMENTS

WO 2015130691 A1 9/2015
WO WO-2019225616 A1 * 11/2019

OTHER PUBLICATIONS

India Examination Search Report for Application No. 201811049060; dated Dec. 26, 2018; 5 pages.
(Continued)

*Primary Examiner* — Tajash D Patel
(74) *Attorney, Agent, or Firm* — CANTOR COLBURN LLP

(57) ABSTRACT

A full-body protection gear is disclosed. The protection gear includes a torso protector, an arm protector, and a lower body protector. The torso protector includes a protective vest defining a neck opening, a first arm opening, and a second
(Continued)

arm opening. The torso protector includes a front shield, aback shield, a first pair of side shields, a second pair of side shields, a first shoulder shield and a second shoulder shield fixedly disposed on the protective vest. The arm protector includes a first part adapted to cover an upper arm region of a user extending from a shoulder to an elbow, and a second part adapted to be removably coupled with the first part and to cover a lower arm region of the user extending from the elbow to a palm. The lower body protector includes a first part adapted to cover pelvic region and an upper leg region of a user, and a second part removably coupled with the first part in a partial overlapping manner, and adapted to cover lower leg region of the user. The lower leg region is indicative of a region extending from above a knee joint to above an ankle joint of the user.

20 Claims, 34 Drawing Sheets

(51) Int. Cl.

| | |
|---|---|
| ***A41D 13/05*** | (2006.01) |
| ***A41D 13/06*** | (2006.01) |
| ***A41D 13/08*** | (2006.01) |
| ***F41H 5/013*** | (2006.01) |
| *A62B 17/00* | (2006.01) |

(52) U.S. Cl.
CPC ..... *A41D 13/0562* (2013.01); *A41D 13/0568* (2013.01); *A41D 13/06* (2013.01); *A41D 13/08* (2013.01); *F41H 1/02* (2013.01); *F41H 5/013* (2013.01); *A62B 17/003* (2013.01)

(56) References Cited

U.S. PATENT DOCUMENTS

| | | | | |
|---|---|---|---|---|
| 5,465,424 | A | 11/1995 | Cudney et al. | |
| 5,943,694 | A * | 8/1999 | Moureaux | A41D 31/245 2/2.5 |
| 6,338,164 | B1 * | 1/2002 | Howard | A41D 13/06 2/242 |
| 7,076,806 | B1 * | 7/2006 | Van Winkle | F41H 1/02 2/2.5 |
| 7,874,022 | B2 * | 1/2011 | McQueer | A41D 13/0015 2/463 |
| 7,937,780 | B2 * | 5/2011 | Matic | F41H 1/02 2/465 |
| 8,479,314 | B2 * | 7/2013 | Colanto | A41D 13/065 2/24 |
| 8,578,513 | B2 * | 11/2013 | Carlson | F41H 1/02 2/2.5 |
| 9,970,736 | B2 * | 5/2018 | Beck | A41D 13/0518 |
| 2004/0154083 | A1 | 8/2004 | McVicker | |
| 2018/0292173 | A1 | 10/2018 | Roby et al. | |
| 2018/0321017 | A1 | 11/2018 | Jonassen et al. | |

OTHER PUBLICATIONS

International Search Report; International Application No. PCT/IN2019/050957; International Filing Date—Dec. 26, 2019; dated May 30, 2020, 2 pages.

* cited by examiner

216

ADJUSTABLE FULL-BODY PROTECTION GEAR

CROSS REFERENCE TO RELATED APPLICATIONS

This application is a National Stage application of PCT/IN2019/050957 filed on Dec. 26, 2019. This application claims priority to India Application Nos. 201811049060 filed on Dec. 26, 2018; 201811049452 filed on Dec. 27, 2018 and 201911028442 filed on Jul. 15, 2019, the entire contents of which are incorporated herein by reference in their entirety.

FIELD OF THE INVENTION

The present disclosure relates to a protective gear and, more particularly, relates to an adjustable full body protection gear.

BACKGROUND

Protection gears are used in various applications, ranging from sports to medical treatments. Different applications demand different type of protection gears. Most of the times, it has been observed that the protection gear as worn by a user doesn't suitably cover or protect the full body of the user. In fact, a user generally has to wear a number of separate protection gears in order to protect the full body. For example, the user may have to wear separate protection gears for protecting the torso, arms, hips, thighs, knees, shins, and calves. First of all, purchasing separate protection gears for each body part is an expensive affair for the user. Further, time required and inconvenience associated with wearing so many gears cannot be ignored.

Even after wearing all these protection gears, the entire body of the user is not entirely covered. Rather, wearing so many separate protection gears restricts free movement of the body parts, for example, due to colliding ill-fitted parts. Considering quick reflexes and movements as required in such applications, manoeuvrability of at least the limbs is absolutely relevant in all such applications. Otherwise, the user may not be able to appropriately respond to the situations arising out of such applications.

Furthermore, the existing body protectors are manufactured with standard dimensional features and therefore, are not customizable to accommodate different body structures of different users. Consequently, they may not provide adequate protection to the body of the users. Moreover, the existing body protectors are not customizable to effectively operate in different applications. Therefore, owing to the ill-fitted parts of the body protectors, the protection of the body is compromised, especially, while being in motion. Moreover, most of the existing protection gears are designed considering male physique and there is a lack of comfortable and effective protection gears for females. In fact, most of the existing protection gears are developed particularly for the males. Therefore, the females are not suitably protected in the realm of abovementioned applications.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment, a full-body protection gear is disclosed. The protection gear includes a torso protector for protecting torso of a wearer. The torso protector includes a protective vest defining a neck opening, a first arm opening, and a second arm opening. The torso protector includes a front shield fixedly disposed on the protective vest, a back shield fixedly disposed on the protective vest and adapted to form a convex shaped structure for protecting a back of the wearer, a first pair of side shields fixedly disposed on the protective vest and adapted to form a convex shaped rectangular structure for protecting lower left abdomen of the wearer, a second pair of side shields fixedly disposed on the protective vest and adapted to form a convex shaped rectangular structure for protecting lower right abdomen of the wearer, a first shoulder shield fixedly disposed on the protective vest and adapted to form an elongated convex structure with curved edges for protecting left shoulder of the wearer, and a second shoulder shield fixedly disposed on the protective vest and adapted to form an elongated convex structure with curved edges for protecting right shoulder of the wearer. The protection gear further includes at least one arm protector including a first part adapted to cover an upper arm region of a user extending from a shoulder to an elbow, and a second part adapted to be removably coupled with the first part and to cover a lower arm region of the user extending from the elbow to a palm. The protection gear also includes a lower body protector including a first part adapted to cover pelvic region and an upper leg region of a user, and a second part removably coupled with the first part in a partial overlapping manner and adapted to cover lower leg region of the user. The lower leg region is indicative of a region extending from above a knee joint to above an ankle joint of the user.

In an embodiment of the present disclosure, a torso protector for protecting torso of a wearer is disclosed. The torso protector includes a protective vest defining a neck opening, a first arm opening, and a second arm opening. The torso protector includes a front panel, a rear panel integrated with the front panel to cover a front portion, a back portion and a substantial portion of shoulders of the wearer, a first set of lower side panels extending from the front panel, and a second set of lower side panels extending from the rear panel. The second set of lower side panels extend such that the first set of lower side panels is removably attached with the second set of lower side panels to cover a lower left abdomen and lower right abdomen of the wearer. The torso protector includes a front shield fixedly disposed the front panel. The front shield further includes an upper portion adapted to form a convex shaped structure for protecting a chest of the wearer, and a lower portion adapted to form an elongated horizontal structure bearing a curved lens shape for protecting an abdomen of the wearer. The torso protector includes a back shield fixedly disposed on the rear panel and adapted to form a convex shaped structure for protecting a back of the wearer, a first pair of side shields fixedly disposed on the first set of lower side panels and adapted to form a convex shaped rectangular structure for protecting lower left abdomen of the wearer, a second pair of side shields fixedly disposed on the first set of lower side panels and adapted to form a convex shaped rectangular structure for protecting lower right abdomen of the wearer, a first shoulder shield fixedly disposed on the front panel and the rear panel and adapted to form an elongated convex structure with curved edges for protecting left shoulder of the wearer, and a second shoulder shield fixedly disposed on the front panel and the rear panel and adapted to form an elongated convex structure with curved edges for protecting right shoulder of the wearer.

In an embodiment of the present disclosure, an arm protector is disclosed. The arm protector includes a first part adapted to cover an upper arm region of a user extending from a shoulder to an elbow. The first part includes a first foam padding facing the arm, and a pair of first shielding plates attached to the foam padding. The pair of first shielding plates is embossed and has a variable thickness. The arm protector also includes a second part adapted to be removably coupled with the first part and to cover a lower arm region of the user extending from the elbow to a palm. The second part includes a dorsal protector facing outside and formed by a second foam padding and at least one second shielding plate attached to the second foam padding. The dorsal protector is extendable to cover the elbow. The second part further includes a ventral protector facing towards the arm and attached to the dorsal protector at one end. The ventral protector is formed of a third foam padding and at least one third shielding plate attached to the third foam padding.

In an embodiment of the present disclosure, an lower body protector includes a first part adapted to cover pelvic region and an upper leg region of a user, and a second part removably coupled with the first part in a partial overlapping manner and adapted to cover lower leg region of the user. The lower leg region is indicative of a region extending from above a knee joint to above an ankle joint of the user. The first part includes a protective belt adapted to cover a waist region of the user, at least one thigh guard removably coupled to the protective belt and adapted to the protect a thigh of the user, a groin guard removable coupled with the protective belt and the at least one thigh guard and adapted to protect a groin region of the user, and at least one hip plastic shield adapted to be stitched on the protective belt and adapted to protect a hip region of the user. The at least one hip plastic shield is embossed and has a variable thickness. The second part includes at least one upper knee guard adapted to cover an upper knee region of the user, at least one knee guard removably coupled to the at least one upper knee guard and adapted to cover a knee of the user, at least one shin guard removably coupled to the at least one knee guard and adapted to cover a shin of the user, and at least one calf guard removably coupled with the at least one shin guard and adapted to cover a calf of the user. At least one of the protective belt, the at least one thigh guard, the groin guard, the at least one upper knee guard, the at least one knee guard, the at least one shin guard, and the at least one calf guard includes a protective plastic shield attached over a foam padding, and protective plastic shields are embossed.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1A:
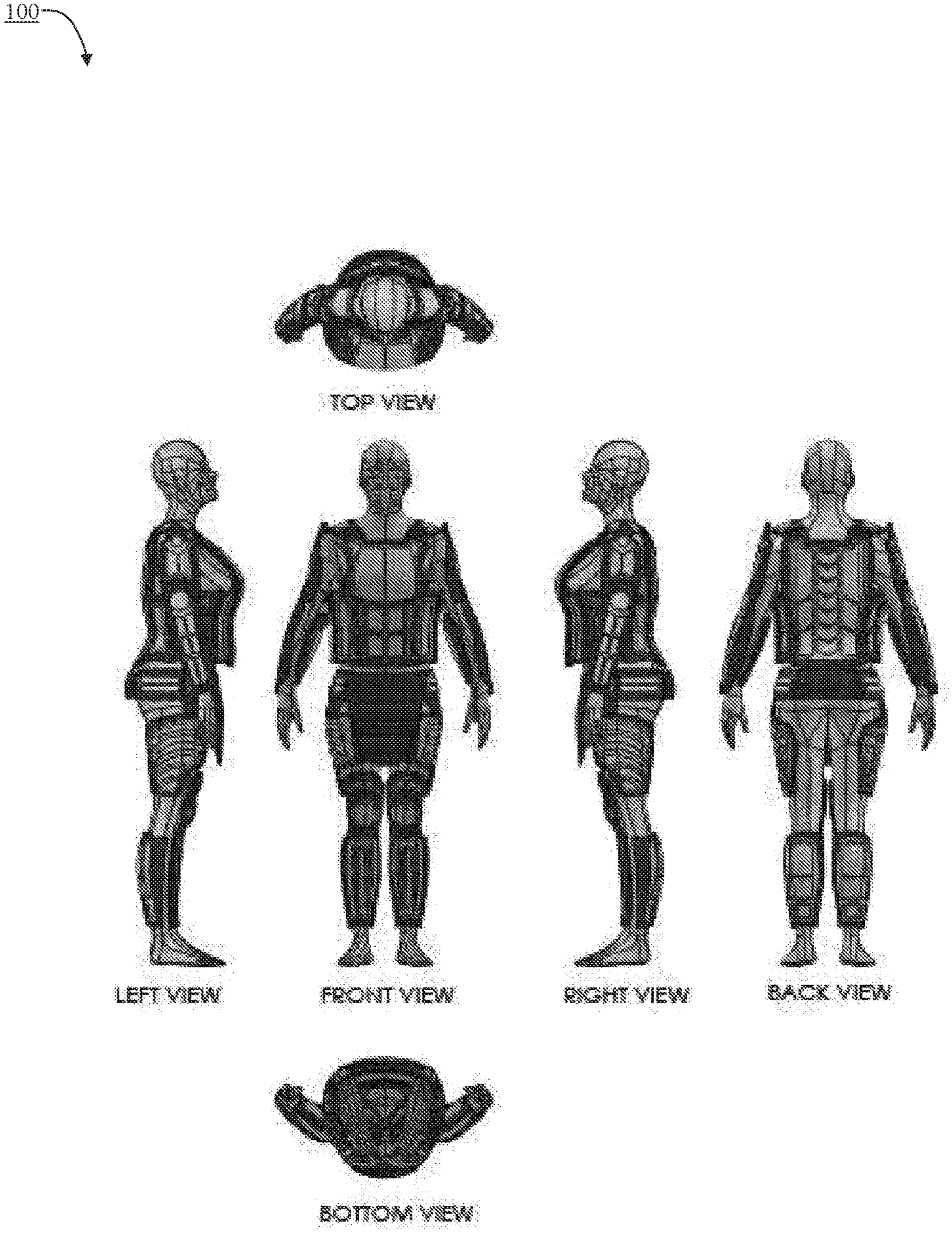
FIG. 1A and FIG. 1B illustrate various views of an adjustable full-body protection gear, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

Figure 1B:
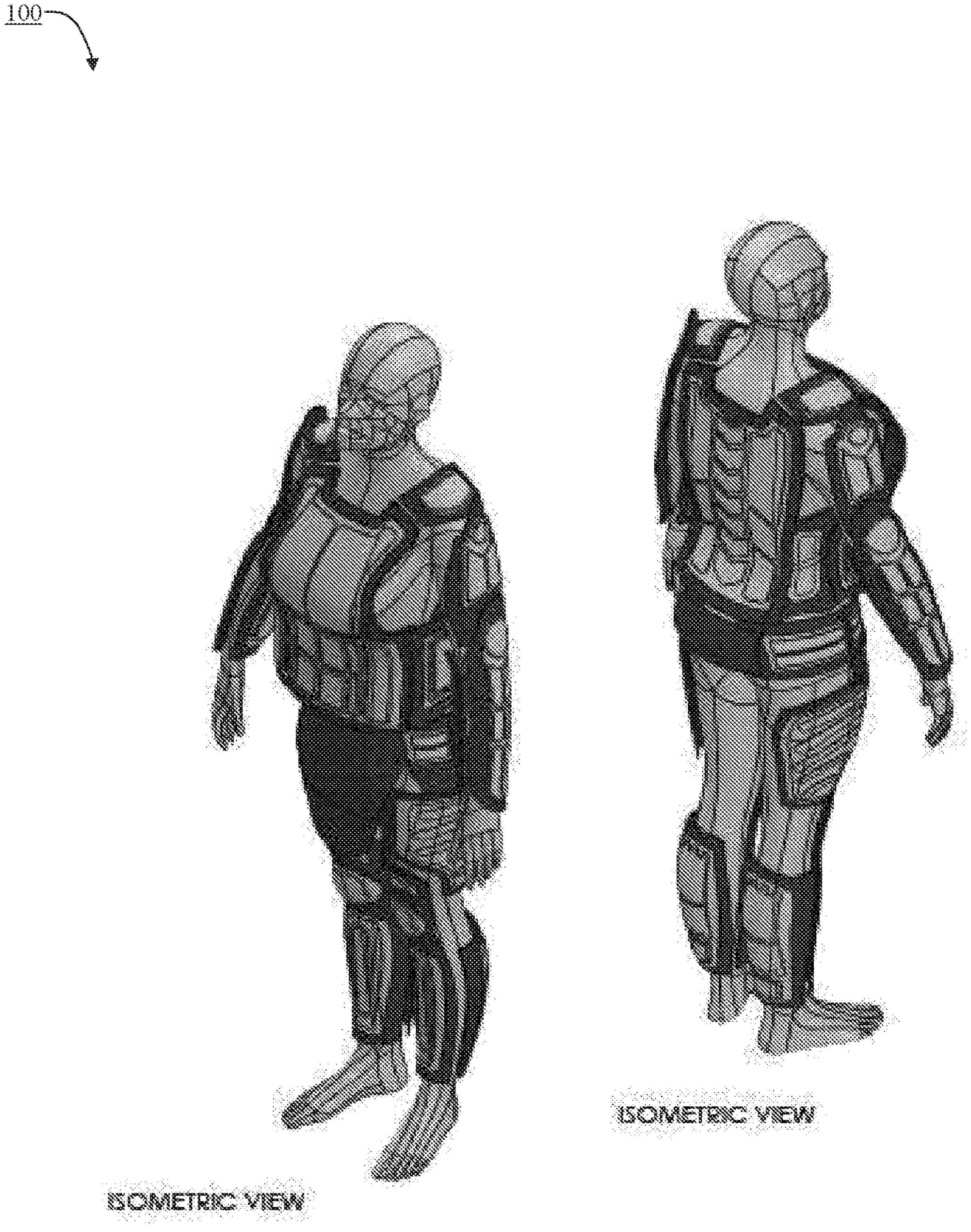

FIG. 1A and FIG. 1B illustrate various views of an adjustable full-body protection gear 100, according to an embodiment of the present disclosure. The protection gear 100 includes a torso protector for protecting torso of a wearer, at least one arm protector for protecting arms of the wearer, and a lower body protector for protecting the lower body of the wearer.

Figure 2:
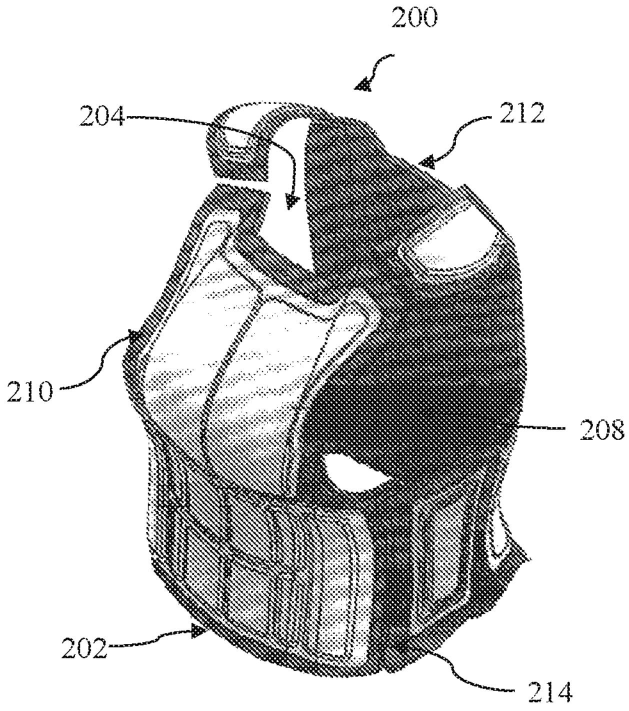
FIG. 2 illustrates a first perspective view of a torso protector of the full-body protection gear, in accordance with an embodiment of the present invention.
Figure 3:
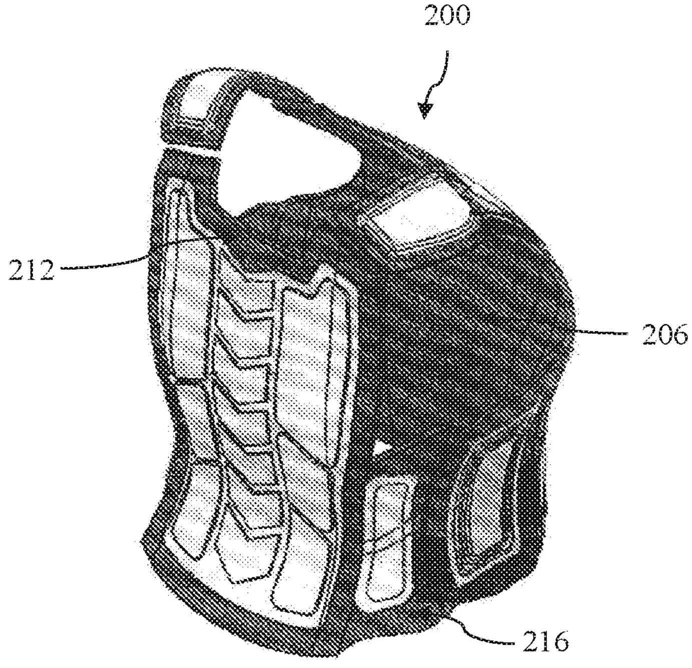
FIG. 3 illustrates a second perspective view of the torso protector, in accordance with the embodiment of the present invention.

FIG. 2 illustrates a first perspective view of the torso protector 200 for protecting a torso of a wearer, in accordance with an embodiment of the present invention. The wearer is a female wearer. The first perspective view corresponds to front of the torso protector 200. FIG. 3 illustrates a second perspective view of the torso protector 200, in accordance with an embodiment of the present invention. The second perspective view corresponds to rear of the torso protector 200.

Referring to FIG. 2 and FIG. 3, the torso protector 200 comprises a protective vest 202 (depicted by dark portions) defining a neck opening 204, a first arm opening 206, and a second arm opening 208 to protect torso, excluding head and hands, of the wearer. The protective vest 202 includes a front panel 210 and a rear panel 212. The rear panel 212 is integrated with the front panel 210 to cover a front portion, a back portion, and a substantial portion of shoulders of the wearer. A plurality of foam pads (not shown in the figure) are placed inside the front panel 210 and the rear panel 212. The plurality of foam pads is successively arranged between a first layer of textile material (not shown in the figure) and a second layer of textile material (not shown in the figure). Examples of the textile material include, but not limited to, 230 GSM fire retardant proban 25 wash. The protective vest 202 can be manufactured using techniques as known in the art such as injection moulding. In an example of manufacturing, the first layer of textile material and the second layer of textile material are sewn together after placing the plurality of foam pads between the first layer of textile material and the second layer of textile material.

The protective vest 202 further includes a first set of lower side panels 214 extending from the front panel 210 and a second set of lower side panels 216 extending from the rear panel 222. The first set of lower side panels 214 is removably attached with the second set of lower side panels 216 to cover a lower left abdomen and a lower right abdomen of the wearer. In an example, the first set of lower side panels 214 is attached with the second set of lower side panels 216 by placing the first set of lower side panels 214 over the second set of lower side panels 216. In an example, the first set of lower side panels 214 may be removably attached with the second set of lower side panels 216 through fasteners, such as Velcro, buckles, snap fasteners, press stud, and the like.

Figure 4:
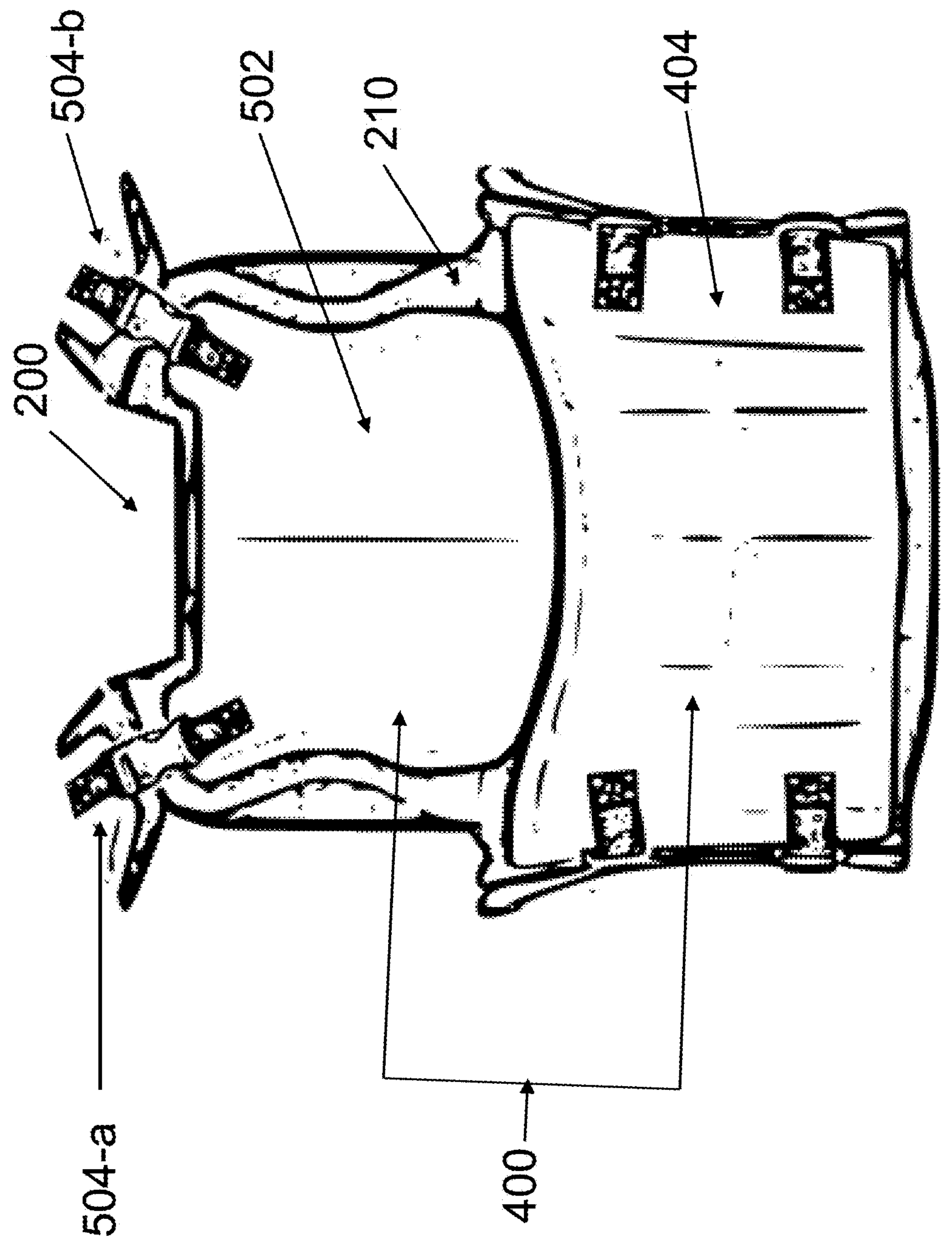
FIG. 4 illustrates a front view of the torso protector, in accordance with the embodiment of the present invention.

FIG. 4 illustrates a front view of the torso protector 200, in accordance with the embodiment of the present invention. The front panel 210 includes a front shield 300 fixedly disposed on the front panel 210. The front shield 400 may be fixed to the front panel 210 by various fixing means such as threads and adhesives. In an example, the front shield 400 is sewn on the front panel 210. In another example, the front shield 400 is disposed using an adhesive. In an implementation, the front shield 400 has a variable range of thickness from 2 millimetres (mm) to 4 mm to protect a chest portion and an abdomen portion of the wearer. In an example, the front shield 400 is made of hard plastic material. As would be understood, material of the front shield 400 is not limited to hard plastic and may include any suitable material in accordance with requirement of manufacturing the shield.

Further, the front shield 400 comprises an upper portion 402 adapted to form a convex shaped structure for protecting the chest portion of the wearer. The upper portion 402 is formed by embossing a plurality of sheets placed one over another such that a dimension of each of the plurality of sheets increases from inside (i.e., in contact with the wearer) to outside. In an implementation, the embossing of the plurality of sheets results in the upper portion 402 having a variable range of thickness from 2 mm to 4 mm. In an example, the plurality of sheets is made of hard plastic material. As would be understood, material of the plurality of sheets is not limited to hard plastic and may include any suitable material in accordance with requirement of manufacturing the upper portion 402. The upper portion 402 can be manufactured using techniques as known in the art such as injection moulding.

Further, the front shield 400 comprises a lower portion 404 adapted to form an elongated horizontal structure bearing a curved lens shape for protecting the abdomen portion of the wearer. The lower portion 404 is formed by embossing the plurality of sheets placed one over another. In an implementation, such embossing results in the lower portion 404 having a variable range of thickness from about 2 mm to 4 mm. In an example, the lower portion 404 can be formed by embossing a pair of two sheets. In an example, the plurality of sheets is made of hard plastic material. As would be understood, material of the plurality of sheets is not limited to hard plastic and may include any suitable material in accordance with requirement of manufacturing the lower portion 404. The lower portion 404 can be manufactured using techniques as known in the art such as injection moulding. Further, both the upper portion 402 and the lower portion 404 may include a plurality of embossed patterns to minimize force of impact and divert projectile away from the wearer. Each of the embossed patterns can either have same pattern or distinct patterns. When a projectile strikes either the upper portion 402 or the lower portion 404, the energy of the projectile spreads out sideways through the plurality of sheets. Because the energy is divided between the plurality of sheets, and spreads over a large area, the energy is quickly absorbed resulting in lesser impact to the wearer. For example when a player catches ball in cricket match, the player lowers hands to decrease momentum of ball, thereby decreasing impact of force exerted by accelerated ball on the player's hand while catching the ball. In similar manner, when a projectile strikes on the wearer from front side, such as pelted stone, the plurality of embossed patterns decreases momentum of impact from the projectile. In said example, the plurality of embossed patterns will act as a decelerating agent and thus decreases overall impact from the projectile on body of the wearer.

Figure 5:
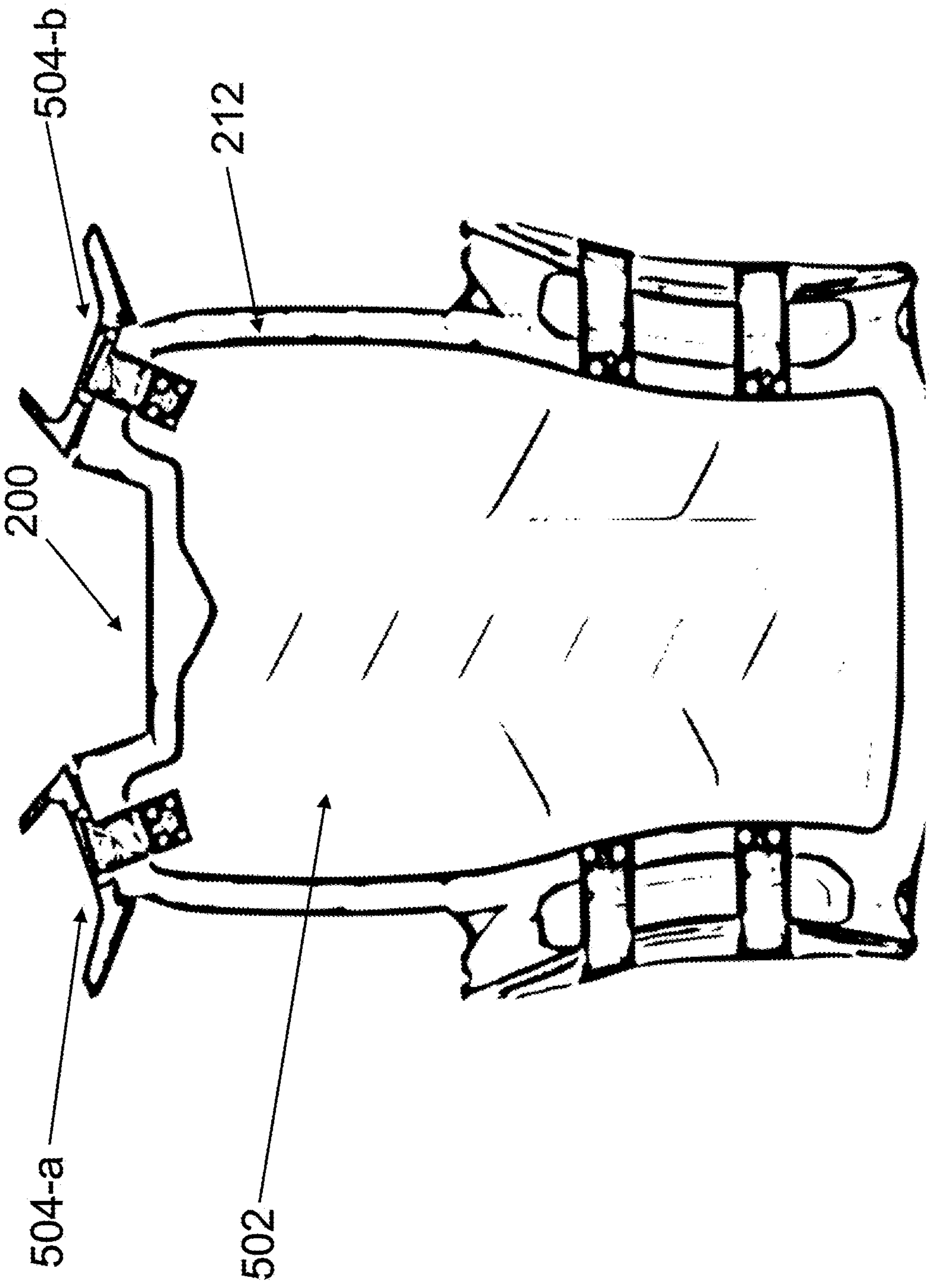
FIG. 5 illustrates a rear view of the torso protector, in accordance with the embodiment of the present invention.

FIG. 5 illustrates a rear view of the torso protector 200, in accordance with the embodiment of the present invention. The rear panel 212 includes a back shield 502 fixedly disposed on the rear panel 212. The back shield 502 may be fixed to the rear panel 212 by various fixing means such as threads and adhesives. In another example, the back shield 502 is disposed on the rear panel 212 using an adhesive. Further, the back shield 502 is adapted to form a convex shaped structure for protecting the back portion of the wearer. The convex shaped structure of the back shield 502 aligns with curvature of the back of the wearer. In an example, the back shield 502 may form an S-shaped structure along vertical length of the back portion of the wearer.

Further, the back shield 502 is formed by embossing the plurality of sheets placed one over another. In an implementation, such embossing results in the back shield 502 having a variable range of thickness from about 2 mm to 4 mm. In an example, the back shield 502 can be formed by embossing a pair of two sheets. In an example, the plurality of sheets is made of hard plastic material. As would be understood, material of the plurality of sheets is not limited to hard plastic and may include any suitable material in accordance with requirement of manufacturing the back shield 502. The back shield 502 can be manufactured using techniques as known in the art such as injection moulding.

Furthermore, the back shield 502 may include a plurality of embossed pattern to minimize force of impact and divert projectile away from the wearer. For example, when a projectile is thrown towards the wearer from backside, momentum of projectile will be decreased till it comes in contact with the back of the wearer by the plurality of embossed pattern. In said example, the plurality of embossed pattern will act as a decelerating agent and thus decreases overall impact of projectile on body of the wearer. Each of the embossed patterns can either have same pattern or distinct patterns.

Referring to FIG. 4 and FIG. 5, the front panel 210 and the rear panel 212 comprises a first shoulder shield 504-*a* and a second shoulder shield 504-*b* fixedly disposed on the front panel 210 and the rear panel 212 covering the substantial portions of the shoulders of the wearer. The first shoulder shield 504-*a*, and the second shoulder shield 504-*b* may be fixed to the front panel 210 and the rear panel 212 by various fixing means such as threads and adhesives. In an example, the first shoulder shield 504-*a* and the second shoulder shield 504-*b* are sewn on the front panel 210 and the rear panel 212, respectively. In another example, the first shoulder shield 504-*a* and the second shoulder shield 504-*b* are disposed using an adhesive. Further, the first shoulder shield 504-*a* and the second shoulder shield 504-*b* are connected to the upper portion 402 of the front panel 210 and the back shield 502 through fasteners.

Further, the first shoulder shield 504-*a* and the second shoulder shield 504-*b* are adapted to form an elongated convex structure with curved edges for protecting left shoulder and right shoulder, respectively, of the wearer. The first shoulder shield 504-*a* and the second shoulder shield 504-*b* are formed by embossing the plurality of sheets placed one over another. In an implementation, such embossing results in the first shoulder shield 504-*a* and the second shoulder shield 504-*b* having a variable range of thickness from about 2 mm to 4 mm. In an example, the first shoulder shield 504-*a* and the second shoulder shield 504-*b* can be formed by embossing a pair of two sheets. In an example, the plurality of sheets is made of hard plastic material. As would be understood, material of the plurality of sheets is not limited to hard plastic and may include any suitable material in accordance with requirement of manufacturing the first shoulder shield 504-*a* and the second shoulder shield 504-*b*. In an example, the pair of sheets forms a D-shaped structure in a manner such that one of the pair of sheets is smaller than the other and the smaller sheet is placed upon larger sheet to form the D-shaped closed structure.

Figure 6:
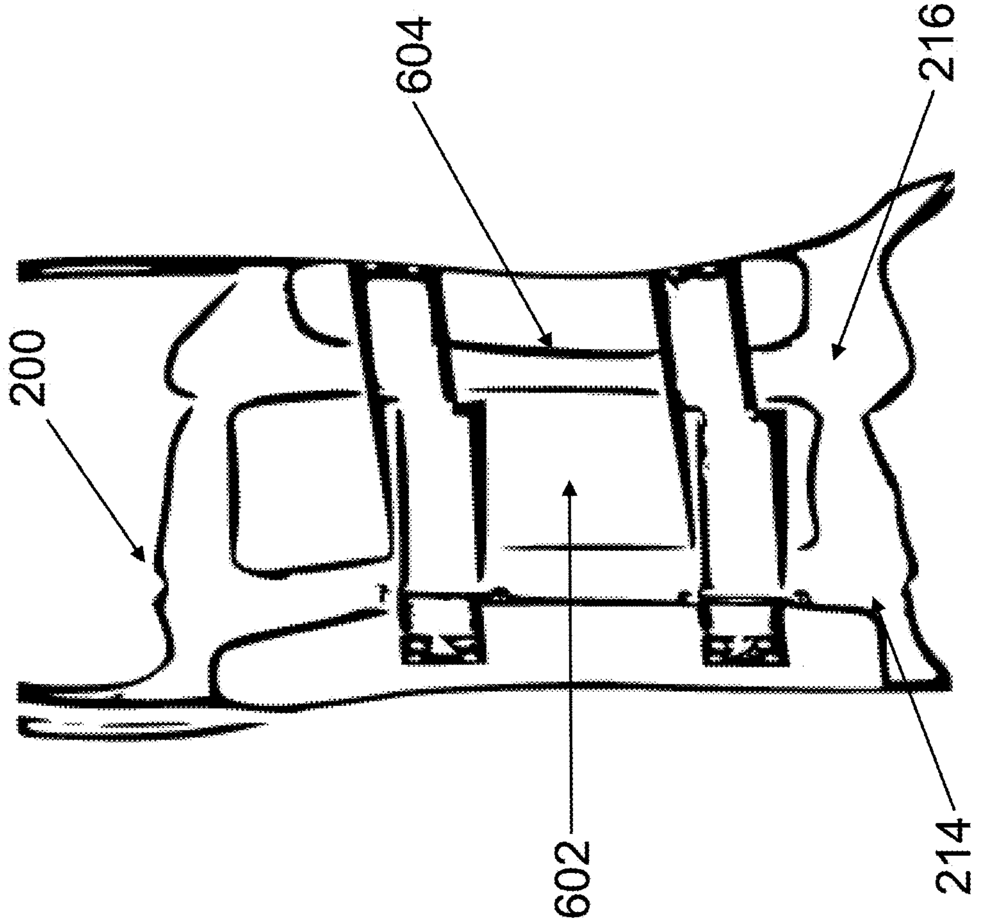
FIG. 6 illustrates a side view of the torso protector, in accordance with the embodiment of the present invention.
Figure 7A:
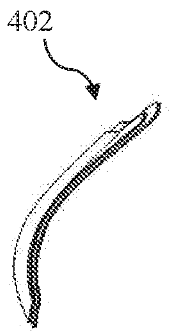
FIGS. 7(*a*)-7(*e*) illustrate various views of an upper portion of front shield adapted for the torso protector, in accordance with the embodiment of the present invention.
Figure 7B:
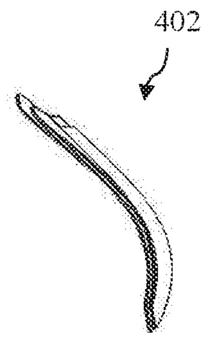
Figure 7C:
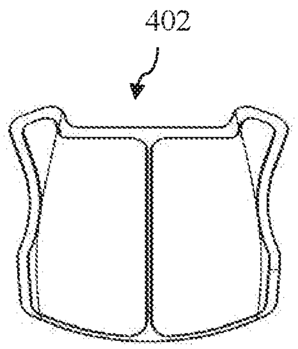
Figure 7D:
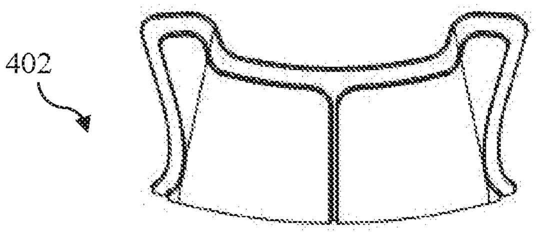
Figure 7E:
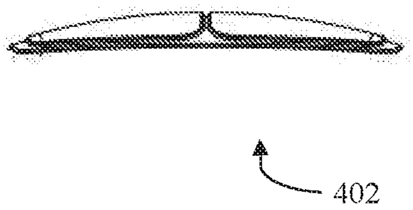
Figure 8A:
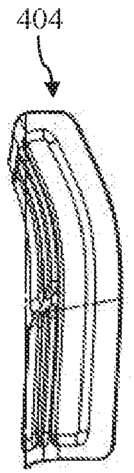
FIGS. 8(*a*)-8(*e*) illustrate various views of a lower portion of a front shield adapted for the torso protector, in accordance with the embodiment of the present invention.
Figure 8B:
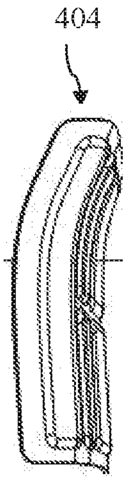
Figure 8C:
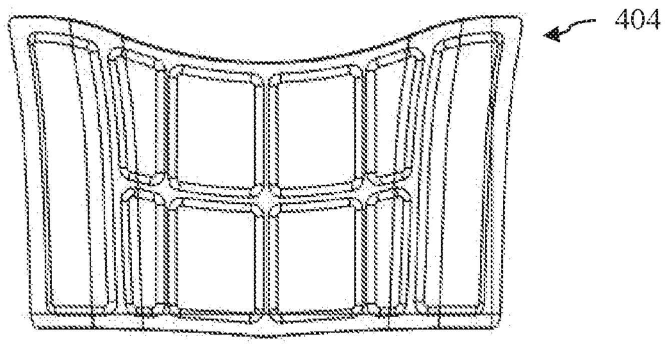
Figure 8D:
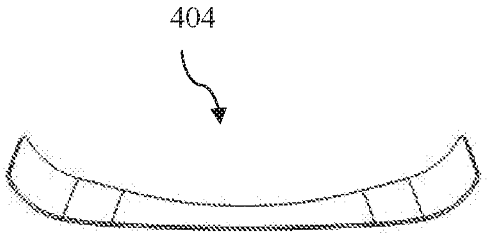
Figure 8E:
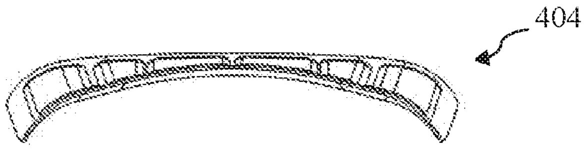
Figure 9A:
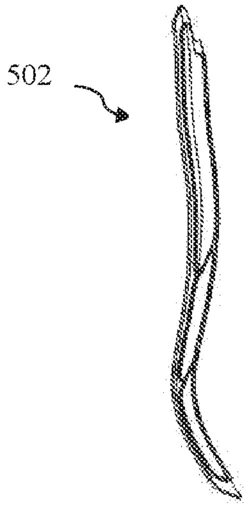
FIGS. 9(*a*)-9(*e*) illustrate various views of a back shield adapted for the torso protector, in accordance with the embodiment of the present invention.
Figure 9B:
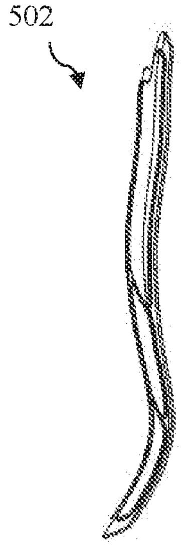
Figure 9C:
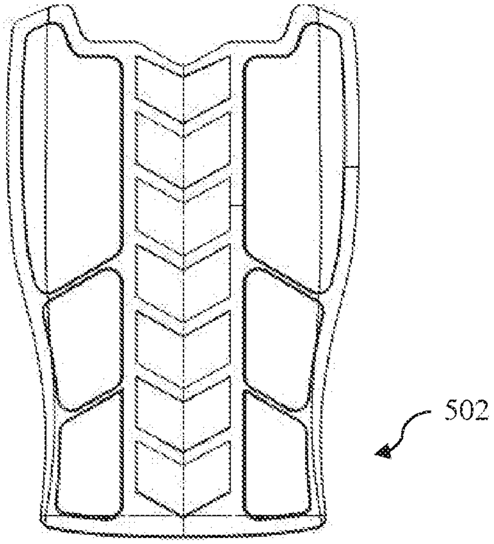
Figure 9D:
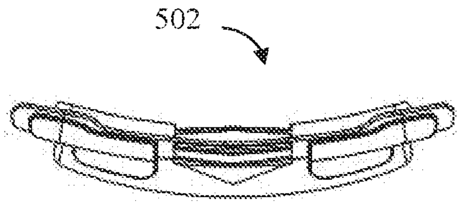
Figure 9E:
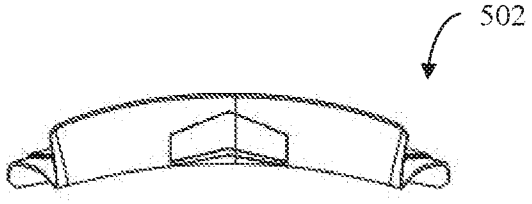
Figure 10A:
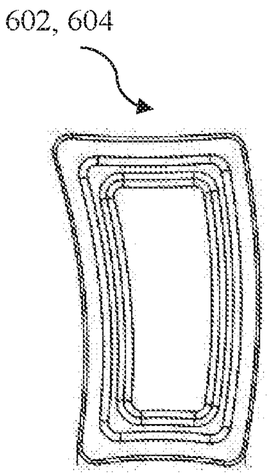
FIGS. 10(*a*)-10(*e*) illustrate various views of one of first pair of side shields and second pair of side shields adapted for the torso protector, in accordance with the embodiment of the present invention.
Figure 10B:
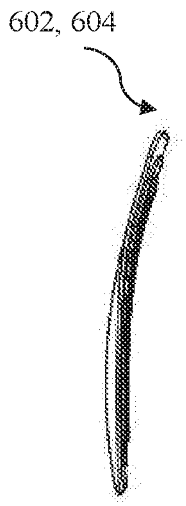
Figure 10C:
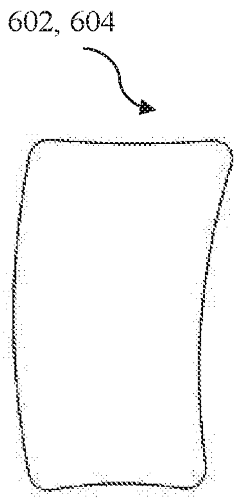
Figure 10D:
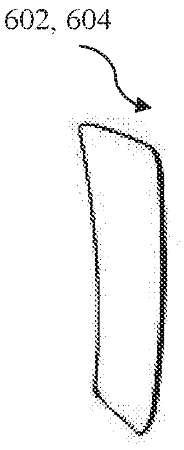
Figure 10E:
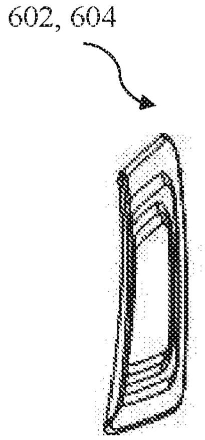
Figure 11A:
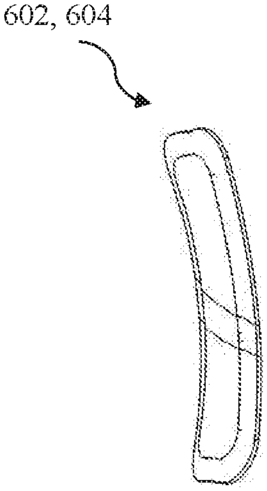
FIGS. 11(*a*)-11(*e*) illustrate various further views of the first pair of side shields and the second pair of side shields adapted for the torso protector, in accordance with the embodiment of the present invention.
Figure 11B:
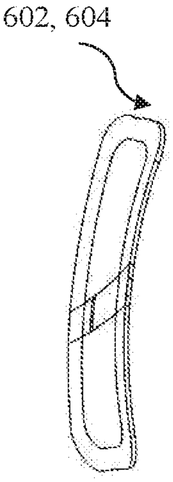
Figure 11C:
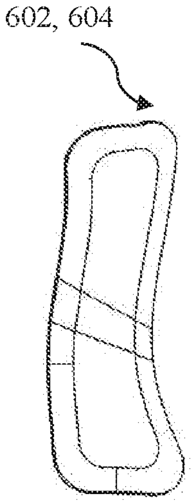
Figure 11D:
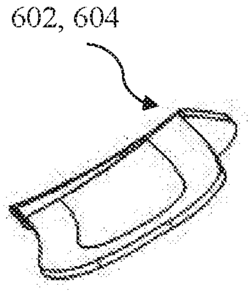
Figure 11E:
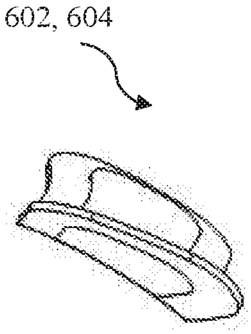
Figure 12A:
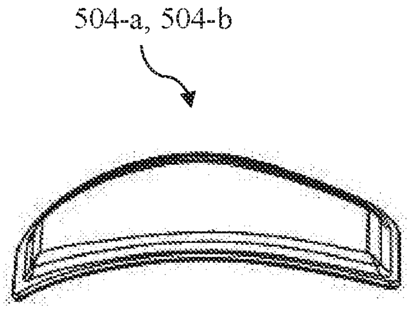
FIGS. 12(*a*)-12(*e*) illustrate various views of shoulder shields adapted for the torso protector, in accordance with the embodiment of the present invention.
Figure 12B:
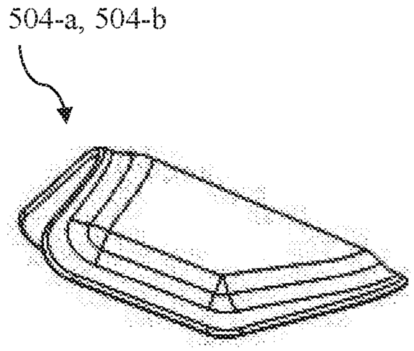
Figure 12C:
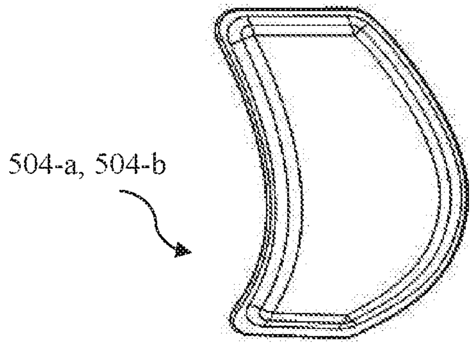
Figure 12D:
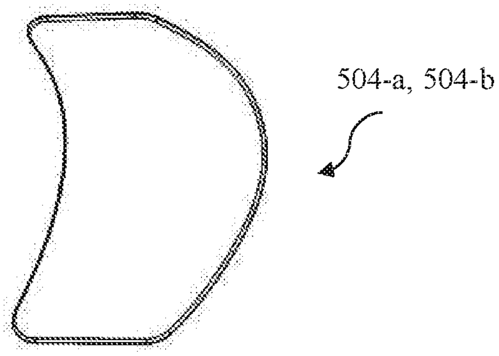
Figure 12E:
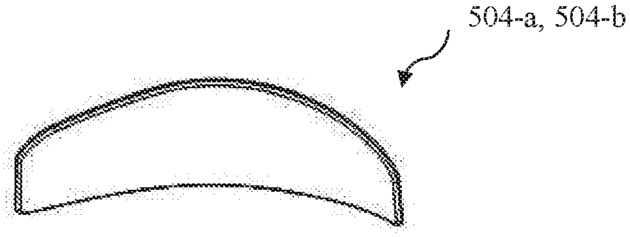

FIG. 6 illustrates a side view of the torso protector 200, in accordance with the embodiment of the present invention. The first set of lower side panels 214 extends from the front panel 210 and the second set of lower side panels 216 extends from the rear panel 212 include a first pair of side shields 602. The first pair of side shields 602 is fixedly disposed on the first set of lower side panels 214 and the second set of lower side panels 216 to protect a lower right abdomen of the wearer. The first pair of side shields 602 is adapted to form a convex shaped rectangular structure.

Further, the first set of lower side panels 214 extending from the front panel 210 and the second set of lower side panels 216 extending from the rear panel 212 includes a second pair of side shields 604. The second pair of side shields 604 is fixedly disposed on the first set of lower side panels 214 and the second set of lower side panels 216 to protect a lower left abdomen of the wearer. The second pair of side shields 604 is adapted to form a convex shaped rectangular structure.

Further, the first pair of side shields 602 and the second pair of side shields 604 are fixed to the first set of lower side panels 214 and the second set of lower side panels 216 by various fixing means such as threads and adhesives. In an example, the first pair of side shields 602 and the second pair of side shields 604 are sewn on the first set of lower side panels 214 and the second set of lower side panels 216. In another example, the first pair of side shields 602 and the second pair of side shields 604 are disposed using an adhesive.

Further, the first pair of side shields 602 and the second pair of side shields 604 are formed by embossing the plurality of sheets placed one over another. In an implementation, such embossing results in the first pair of side shields 602 and the second pair of side shields 604 having a variable range of thickness from about 2 mm to 4 mm. In an implementation, the plurality of sheets may be rectangular shaped sheets placed successively on each other in a manner such that smaller sized sheet may be placed upon larger sized sheet. The plurality of sheets hinder projectile and protect the wearer. In an example, the plurality of sheets is made of hard plastic material. As would be understood, material of the plurality of sheets is not limited to hard plastic and may include any suitable material in accordance with requirement of manufacturing the back shield 502.

Further, one of the first pair of side shields 602 and the second pair of side shields 604 is placed on the first set of lower side panels 214 extending from the front panel 210. Another shield from the first pair of side shields 602 and the second pair of side shields 604 is placed on the second set of lower side panels 216 extending from the rear panel 212. In an example, another shield has an S-shaped structure.

FIGS. 7(*a*)-7(*e*) illustrates various views of the upper portion 402 of the front shield 400 provided for the torso protector 200, in accordance with an embodiment of the present invention. FIG. 7(*a*) illustrates a right side view of the upper portion 402. FIG. 7(*b*) illustrates a left side view of the upper portion 402. FIG. 7(*c*) illustrates a front view of the upper portion 402. FIG. 7(*d*) illustrates a top view of the upper portion 402. FIG. 7(*e*) illustrates a bottom view of the upper portion 402.

FIGS. 8(*a*)-8(*e*) illustrates various views of the lower portion 404 of the front shield 400 provided for the torso protector 200, in accordance with an embodiment of the present invention. FIG. 8(*a*) illustrates a right side view of the lower portion 404. FIG. 8(*b*) illustrates a left side view of the lower portion 404. FIG. 8(*c*) illustrates a front view of the lower portion 404. FIG. 8(*d*) illustrates a top view of the lower portion 404. FIG. 8(*e*) illustrates a bottom view of the lower portion 404.

FIGS. 9(*a*)-9(*e*) illustrates various views of the back shield 502 adapted for the torso protector 500, in accordance with an embodiment of the present invention. FIG. 9(*a*) illustrates a right view of the back shield 502. FIG. 9(*b*) illustrates a left view of the back shield 502. FIG. 9(*c*) illustrates a front view of the back shield 502. FIG. 9(*d*) illustrates a top view of the back shield 502. FIG. 9(*e*) illustrates a bottom view of the back shield 502.

FIGS. 10(*a*)-10(*e*) illustrates various views of one of the first pair of side shields 602 and the second pair of side shields 604 adapted for the torso protector 200, in accordance with an embodiment of the present invention. FIG. 10(*a*) illustrates a right side view of one of the first pair of side shields 602 and the second pair of side shields 604. FIG. 10(*b*) illustrates a left side view of one of the first pair of side shields 602 and the second pair of side shields 604. FIG. 10(*c*) illustrates a front view of one of the first pair of side shields 602 and the second pair of side shields 604. FIG. 10(*d*) illustrates a top view of one of the first pair of side shields 602 and the second pair of side shields 604. FIG. 10(*e*) illustrates a bottom view of one of the first pair of side shields 602 and the second pair of side shields 604.

FIGS. 11(*a*)-11(*e*) illustrates various views of another shield from the first pair of side shields 602 and the second pair of side shields 604 adapted for the torso protector 200, in accordance with an embodiment of the present invention. FIG. 11(*a*) illustrates a right side view of another shield from the first pair of side shields 602 and the second pair of side shields 604. FIG. 11(*b*) illustrates a left side view of another shield from the first pair of side shields 602 and the second pair of side shields 604. FIG. 11(*c*) illustrates a front view of another shield from the first pair of side shields 602 and the second pair of side shields 604. FIG. 11(*d*) illustrates a top view of another shield from the first pair of side shields 602 and the second pair of side shields 604. FIG. 11(*e*) illustrates a bottom view of another shield from the first pair of side shields 602 and the second pair of side shields 604.

FIGS. 12(*a*)-12(*e*) illustrates various views of the shoulder shields (504-*a*, 504-*b*) adapted for the torso protector 200, in accordance with an embodiment of the present invention. FIG. 12(*a*) illustrates a right side view of the shoulder shields (504-*a*, 504-*b*). FIG. 12(*b*) illustrates a left side view of the shoulder shields (504-*a*, 504-*b*). FIG. 12(*c*) illustrates a front view of the shoulder shields (504-*a*, 504-*b*). FIG. 12(*d*) illustrates a top view of the shoulder shields (504-*a*, 504-*b*). FIG. 12(*e*) illustrates a bottom view of the shoulder shields (504-*a*, 504-*b*).

In an example, area of the plurality of foams pads is larger than area of each of the front shield 400, the back shield 502, the first pair of side shields 602, the second pair of side shields 604, the first shoulder shield 504-*a*, and the second shoulder shield 504-*b*. In an example, dimensions of each of the plurality of sheets increases from inside to outside.

Figure 13:
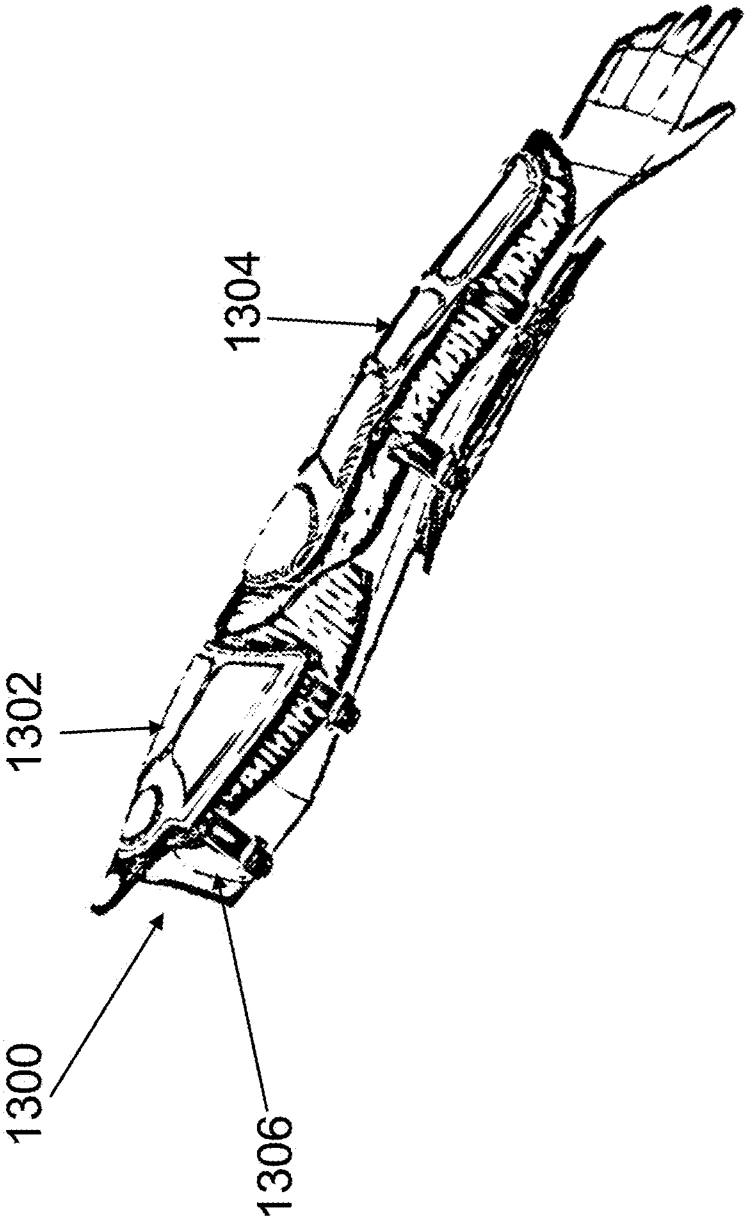
FIG. 13 illustrates a perspective view of an arm protector of the adjustable full-body protection gear, according to an embodiment of the present disclosure.

FIG. 13 illustrates a perspective view of an arm protector 1300, according to an embodiment of the present disclosure. The arm protector 1300 is to be worn by a user to protect his/her arm. The arm protector 1300 may include a first part 1302 adapted to cover an upper arm region of the user. The upper arm region may be understood as the region extending from a shoulder to an elbow of the user. Therefore, the first part 1302 covers a bicep of the user. In an embodiment, edges of the first part 1302 are convex bent.

The arm protector 1300 may also include a second part 1304 adapted to be removably coupled with the first part 1302. The second part 1304 may cover a lower arm region of the user. In an embodiment the lower arm region may be understood as the region extending from the elbow to a palm of the user. In an embodiment, the second part 1304 is coupled to the first part 1302 in such a manner that the second part 1304 is adapted to overlap the first part 1302. In an embodiment, the second part 1304 is adapted to overlap the first part 1302, when the arm of the user is straightened.

An outer portion of the arm protector 1300 may be formed of a layer of hard plastic material with variable thickness. Further, an inner portion of the arm protector 1300 is formed of foam padding. In an embodiment, a series of plastic shields or plates may be sewn on the foam padding. In an embodiment, a length of 2 centimetres may be left on each side of the foam padding after the sewing of the series of plastic shields. Therefore, area covered by the foam padding may be more than an area covered by the series of plastic shields.

In an embodiment, the first part 1302 and the second part 1304 may be assembled into a single unit by using Velcro straps 1306. The Velcro straps 1306 may be stitched along the foam padding.

Figure 14:
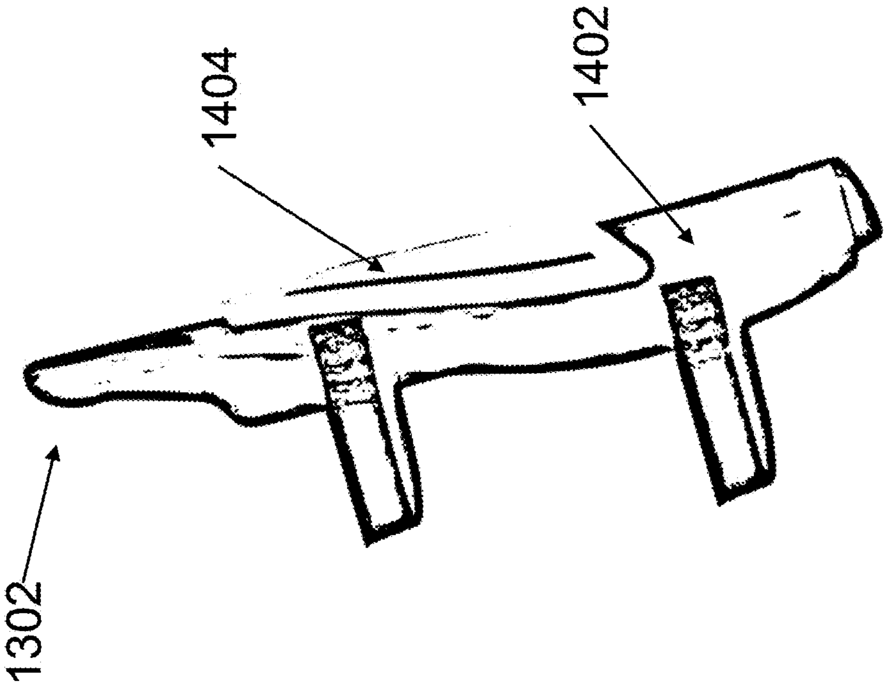
FIG. 14 illustrates a perspective view of a first part of the arm protector, according to an embodiment of the present disclosure.
Figure 15:
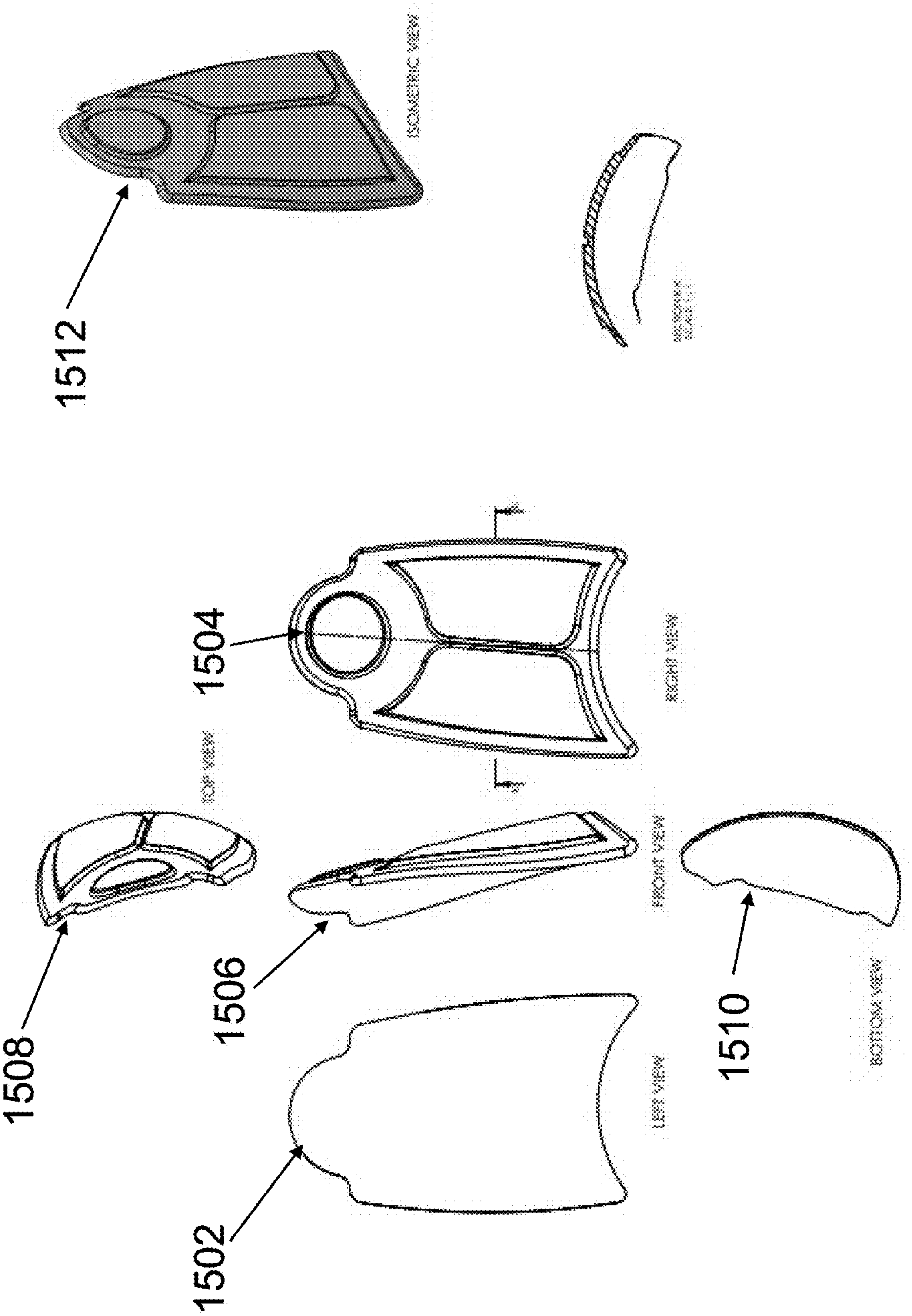
FIG. 15 illustrates a left view, a right view, a front view, a top view, a bottom view, and an isometric view of the first part of the arm protector, according to an embodiment of the present disclosure.

FIG. 14 illustrates a perspective view of the first part 1302 of the arm protector 1300, according to an embodiment of the present disclosure. The first part 1302 may include a first foam padding 1402 and a pair of first shielding plates 1404 attached to the first foam padding 1402. The first foam padding 1402 may be facing the arm. Further, the pair of first shielding plates 1404 embossed and has a variable thickness. In an embodiment, the pair of first shielding plates 1404 has a variable thickness ranging from 2 mm to 4 mm. FIG. 15 illustrates a left view 1502, a right view 1504, a front view 1506, a top view 1508, a bottom view 1510, and an isometric view 1512 of the first part 302, according to an embodiment of the present disclosure.

Referring to FIG. 14 and FIG. 15, in an embodiment, the first part 1302 may include the pair of first shielding plates 1404 embossed in form of two wings-oriented pages of an open book. The pair of first shielding plates 1404 may further be embossed in form of a circle above the wings-oriented pages. The embossing is performed to provide maximum protection to the upper arm region. Further, curved shape of the first part 1302 allows for comfortable fitting on an arm of the user. The shape of the first part 1302 is selected so as to reduce an impact of any object to bones and muscles of the upper arm region.

Figure 16:
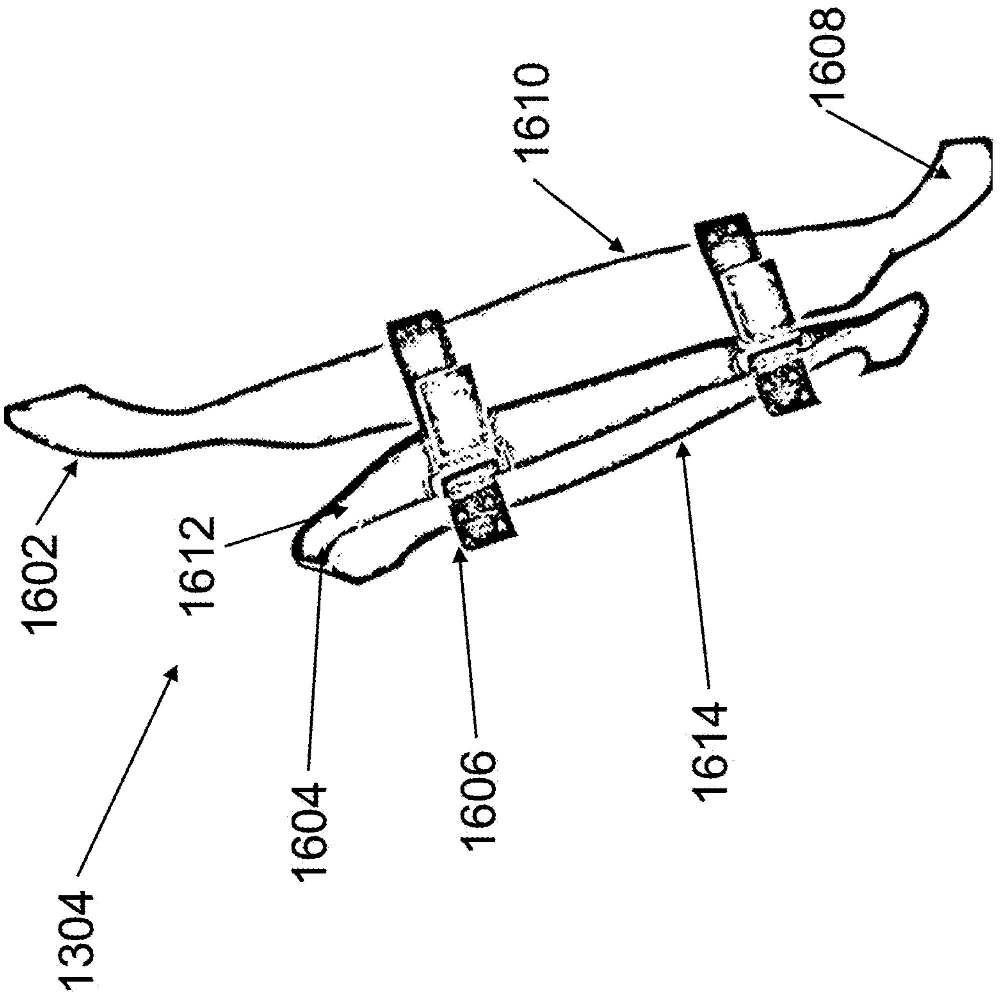
FIG. 16 illustrates a perspective view of a second part of the arm protector, according to an embodiment of the present disclosure.

FIG. 16 illustrates a perspective view of the second part 1304 of the arm protector 1300, according to an embodiment of the present disclosure. The second part 1304 may include a dorsal protector 1602 and a ventral protector 1604 attached to the dorsal protector 1602. In an embodiment, edges of the ventral protector 1604 are concave bent. In an embodiment, the dorsal protector 1602 and the ventral protector 1604 may be attached to each other through one of their respective ends. For example, at one end, the dorsal protector 1602 and the ventral protector 1604 may be sewn to each other. In an embodiment, the dorsal protector 1602 and the ventral protector 1604 may be secured on the arm by at least one Velcro strap 1606. In the illustrated embodiment, the dorsal protector 1602 and the ventral protector 1604 may be secured on the arm by a pair of Velcro straps 1606-1 and 1606-2.

Figure 17:
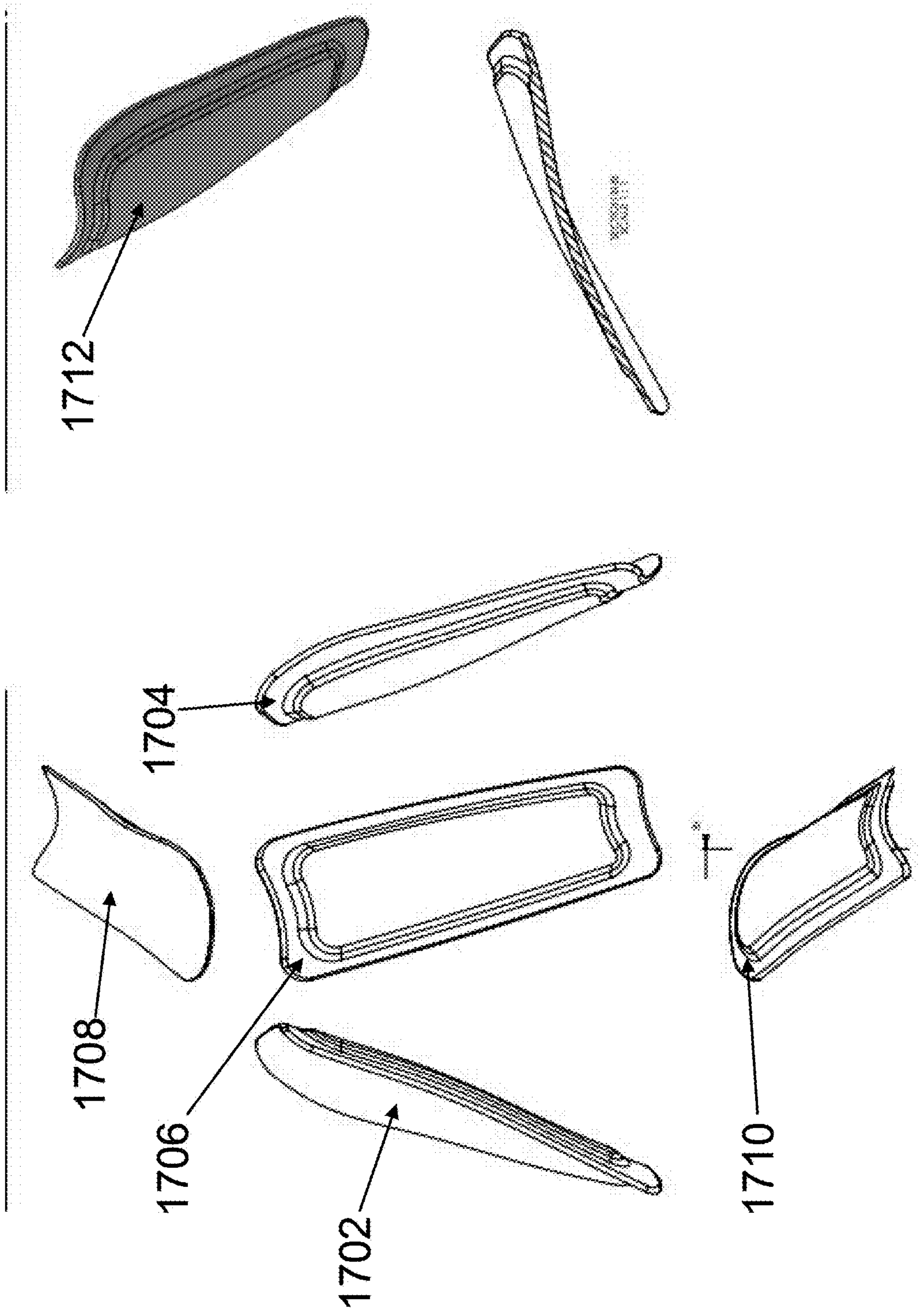
FIG. 17 illustrates a left view, a right view, a front view, a top view, a bottom view, and an isometric view of a dorsal protector of the second part of the arm protector, according to an embodiment of the present disclosure.

FIG. 17 illustrates a left view 1702, a right view 1704, a front view 1706, a top view 1708, a bottom view 1710, and an isometric view 1712 of the dorsal protector 1602, according to an embodiment of the present disclosure. Referring to FIG. 16 and FIG. 17, the dorsal protector 1602 may be facing outside, i.e., in a direction away from the user. The dorsal protector 1602 may be formed by a second foam padding 1608 and at least one second shielding plate 1610 attached to the second foam padding 1608. In an embodiment, the dorsal protector 1602 may be formed of two second shielding plates 1610 having varied thickness. In an embodiment, the dorsal protector 1602 has an embossing in the shape of a fan blade. In an embodiment, the dorsal protector 1602 may be extendable to cover the elbow.

Figure 18:
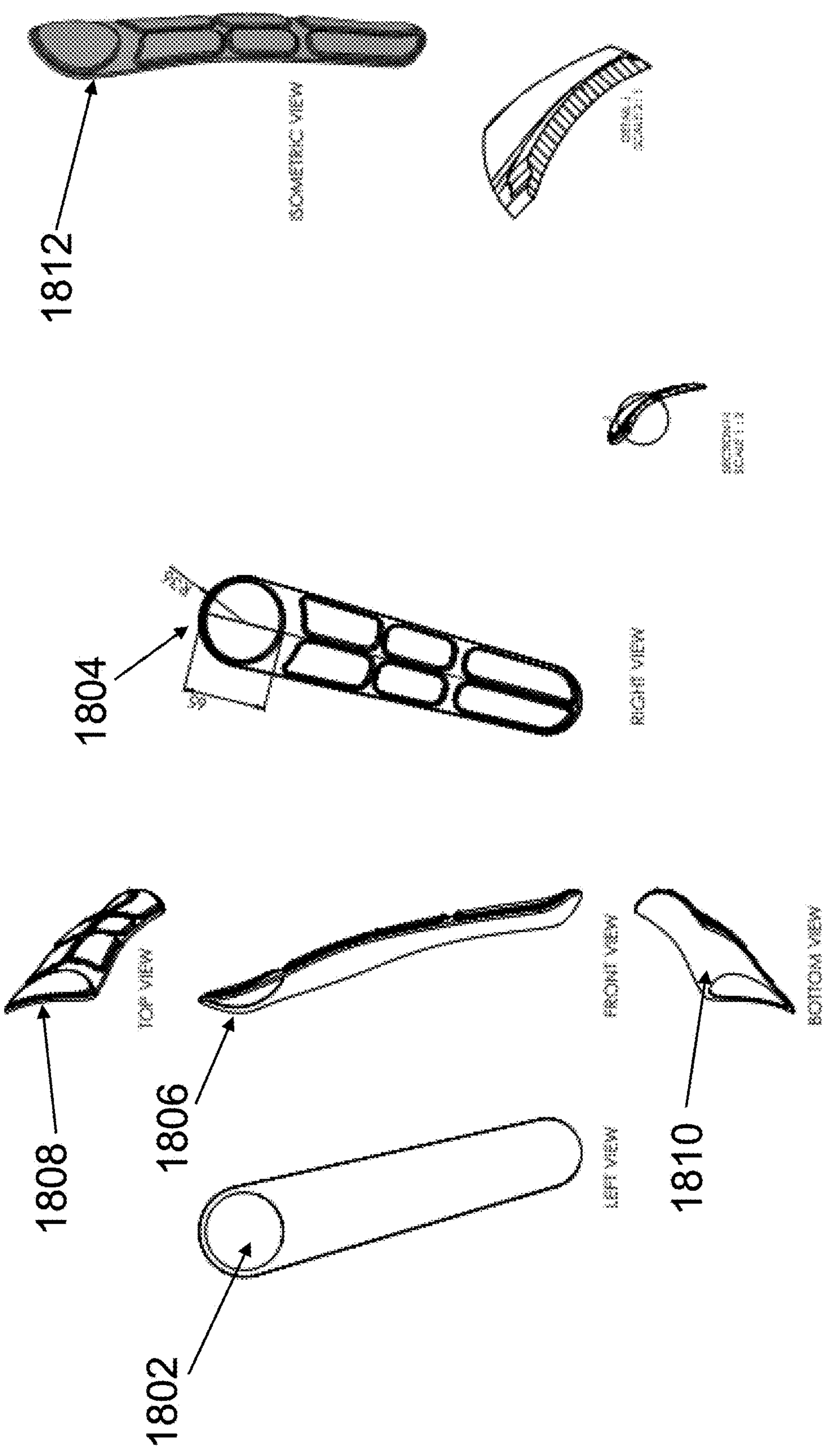
FIG. 18 illustrates a left view, a right view, a front view, a top view, a bottom view, and an isometric view of a ventral protector of the second part of the arm protector, according to an embodiment of the present disclosure.

FIG. 18 illustrates a left view 1802, a right view 1804, a front view 1806, a top view 1808, a bottom view 1810, and an isometric view 1812 of the ventral protector 1604, according to an embodiment of the present disclosure. The ventral protector 1604 may be facing towards the arm. Further, the ventral protector 1604 is formed of a third foam padding 1612 and at least one third shielding plate 1614 attached to the third foam padding 1612. The third shielding plate 1614 is formed of hard plastic with a varied thickness of 2-4 millimetres. In an embodiment, the thickness of the third shielding plate 1614 at a central region is more than other regions of the third shielding plate 1614.

In an embodiment, the arm protector 1300 may further include a shoulder pad (not shown) adapted to be coupled to the first part 1302 and to cover the shoulder. In an embodiment, the shoulder pad may be coupled to the first part 1302 with at least one snap fastener. In another embodiment, the shoulder pad may be coupled to the first part 1302 through a press-stud component. A socket part of the snap fastener may engage with a stud attached with the first part 1302. Further, the shoulder pad may be formed by a fourth padding facing the shoulder and at least one fourth shielding plate having variable thickness attached to the fourth foam padding.

In an embodiment, the pair of first shielding plates 1404, the at least one second shielding plate 1610, the at least one third shielding plate 1614, and the at least one fourth shielding plate are formed of a hard plastic material. In an embodiment, the pair of first shielding plates 1604, the at least one second shielding plate 1610, the at least one third shielding plate 1614, and the at least one fourth shielding plate are formed of a combination polymer of a thermoplastic blend of Polycarbonate (PC) and Acrylonitrile Butadiene Styrene (ABS).

Figure 19:
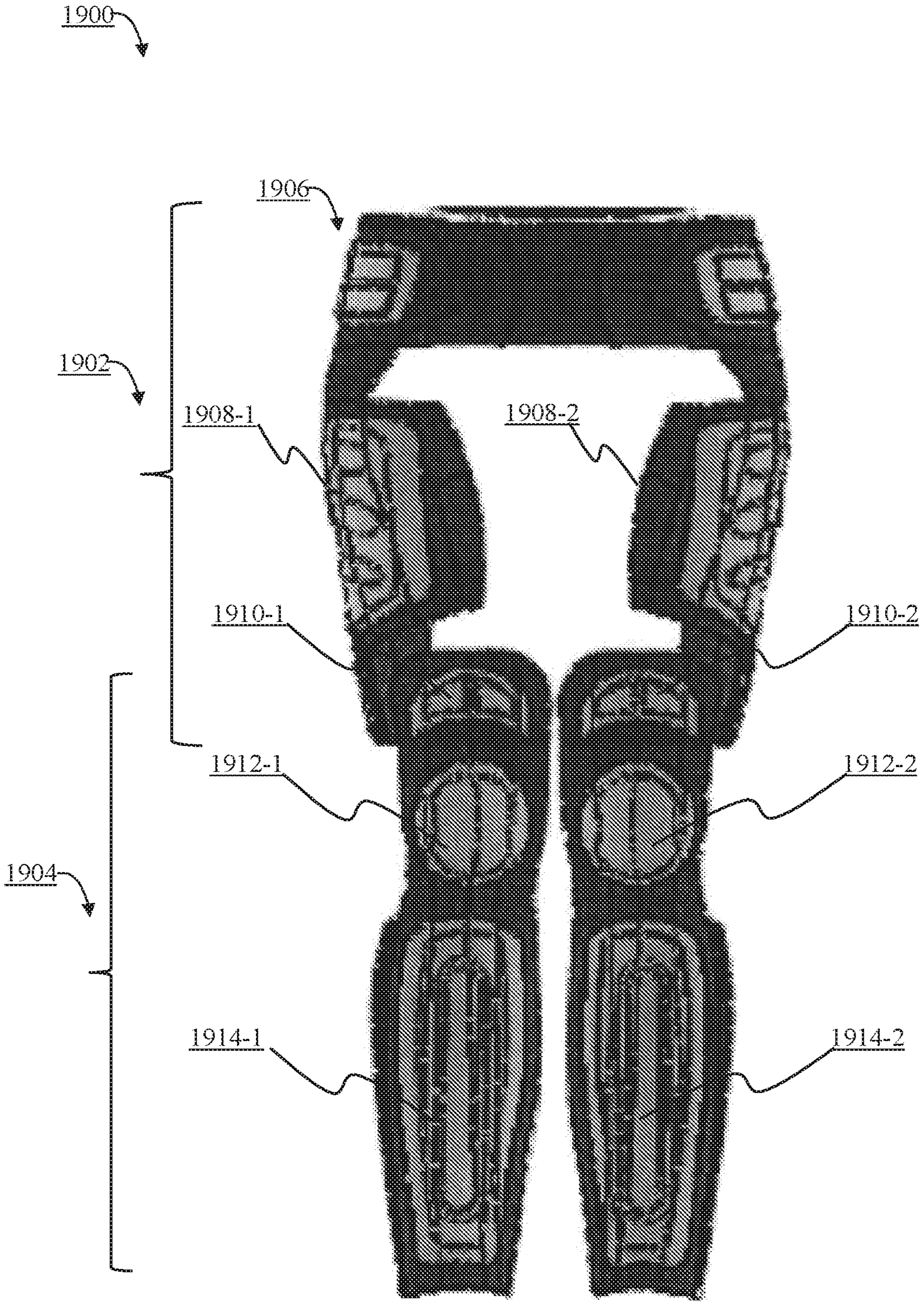
FIG. 19 illustrates a front view of a lower body protector of the adjustable full-body protection gear, according to an embodiment of the present disclosure.
Figure 20:
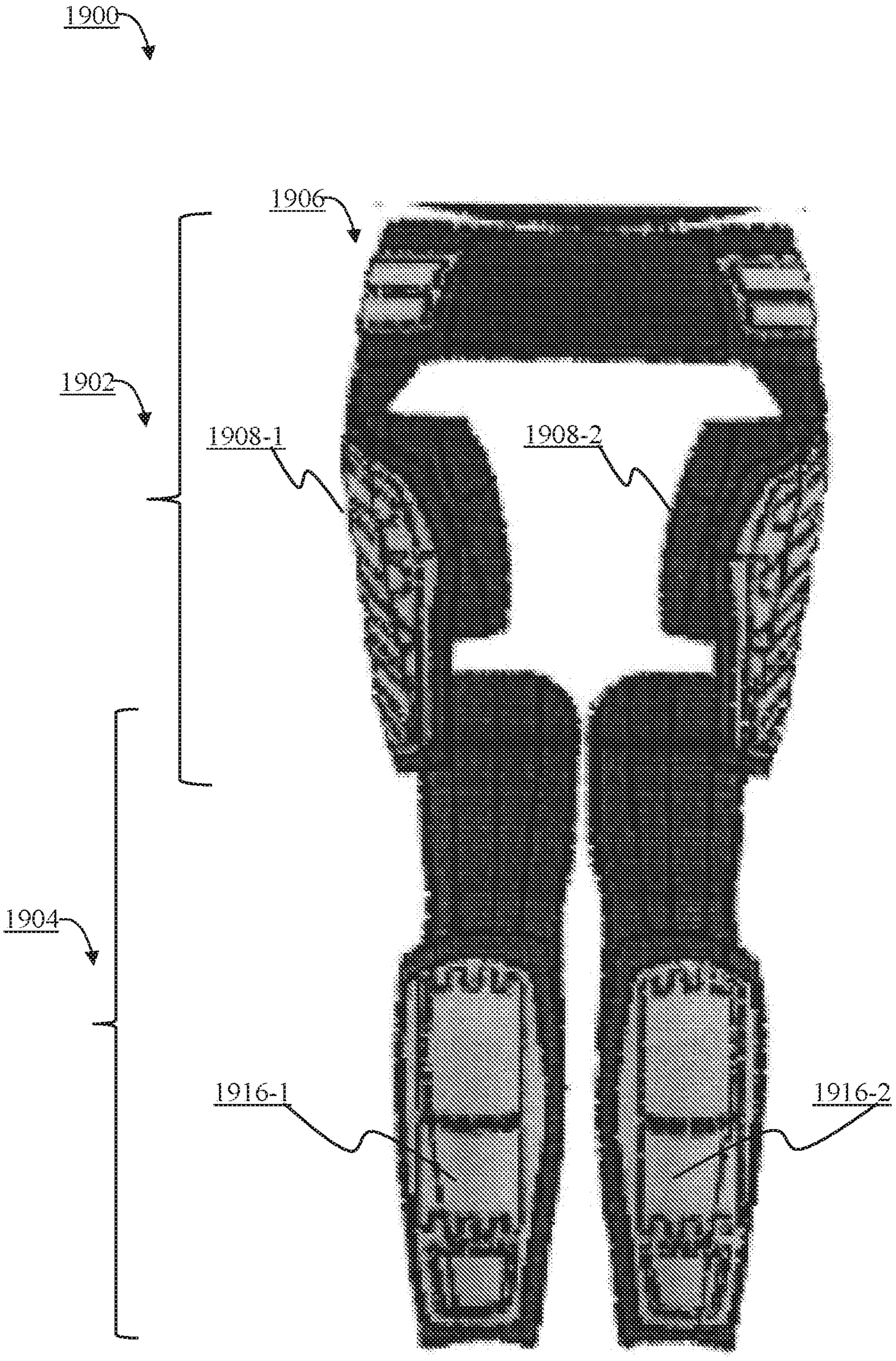
FIG. 20 illustrates a rear view of the lower body protector, according to an embodiment of the present disclosure.
Figure 21:
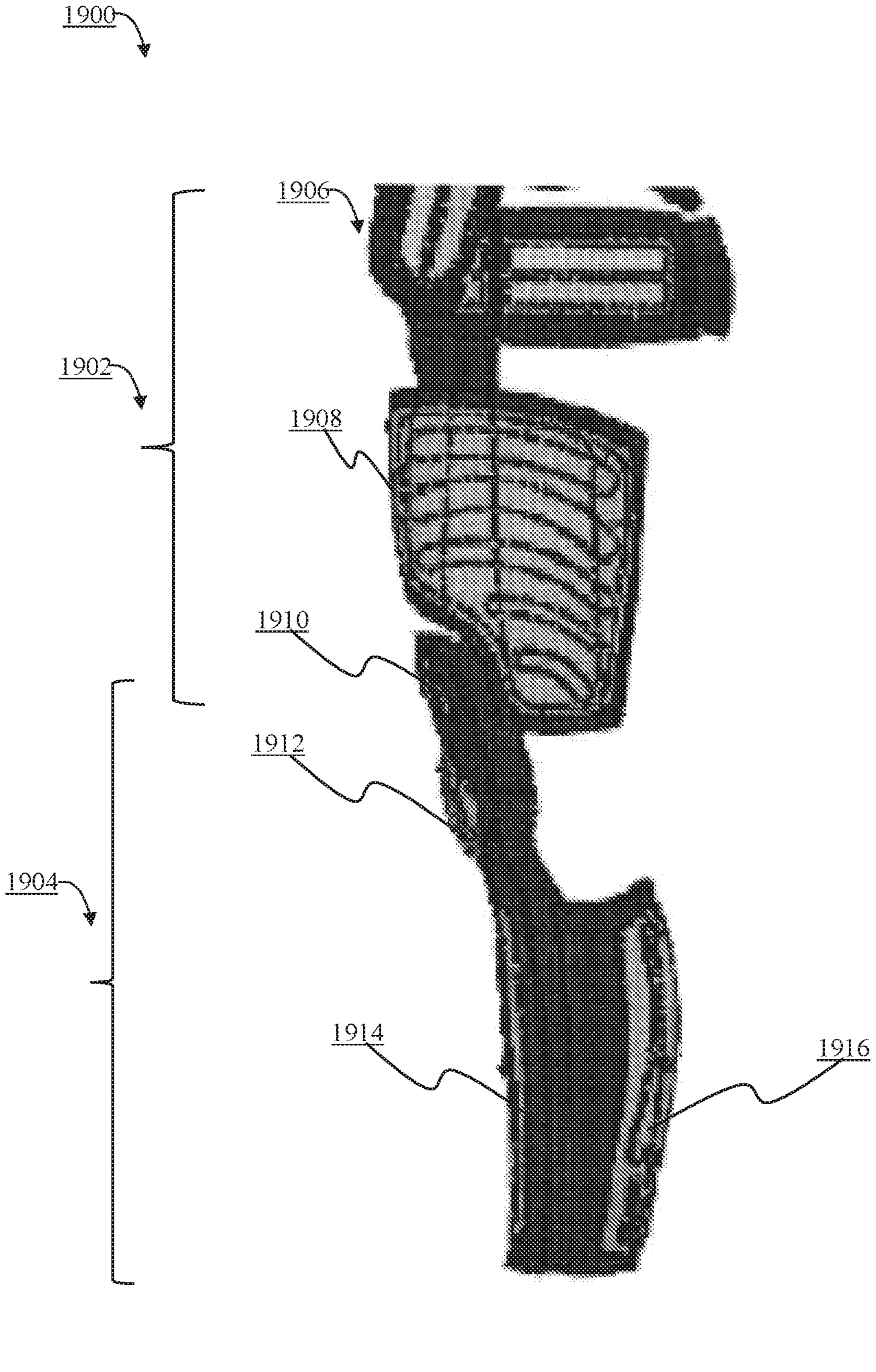
FIG. 21 illustrates a side view of the lower body protector, according to an embodiment of the present disclosure.

FIG. 19 illustrates a front view of a lower body protector 1900, according to an embodiment of the present disclosure. FIG. 20 illustrates a rear view of the lower body protector 1900, according to an embodiment of the present disclosure. FIG. 21 illustrates a side view of the lower body protector 1900, according to an embodiment of the present disclosure. For the sake of brevity, FIG. 19, FIG. 20, and FIG. 21 are explained in conjunction with each other. As the name suggests, the lower body protector 1900 is adapted to provide protection to a lower body of a user.

The lower body protector 1900 may include, but is not limited to, a first part 1902 and a second part 1904 removably coupled with the first part 1902 in a partial overlapping manner. The first part 1902 may be adapted to cover pelvic region and an upper leg region of a user whereas the second part 1904 may be adapted to cover a lower leg region of the user. The upper leg region may include of the entirety of femur till just before a knee joint of the user. Further, the lower leg region may be indicative of a region extending from above a knee joint to above an ankle joint of the user.

In an embodiment, the second part 1904 may be removably coupled to the first part 1902 at least by a Velcro attachment mechanism. For example, the second part 1904 may be removably coupled with the first part 1902 by Velcro layers sewn over both the first part 1902 and the second part 1904. Therefore, a Velcro layer of the first part 1902 may be removably attached with a Velcro layer of the second part 1904, providing the user with an ease of attachment.

Further, the second part 1904 may be removably coupled to the first part 1902 in a partial overlapping manner. For example, an upper portion of the second part 1904 may be adapted to overlap with a lower portion of the first part 1902, for example, when a leg of the user is straightened.

Figure 22A:
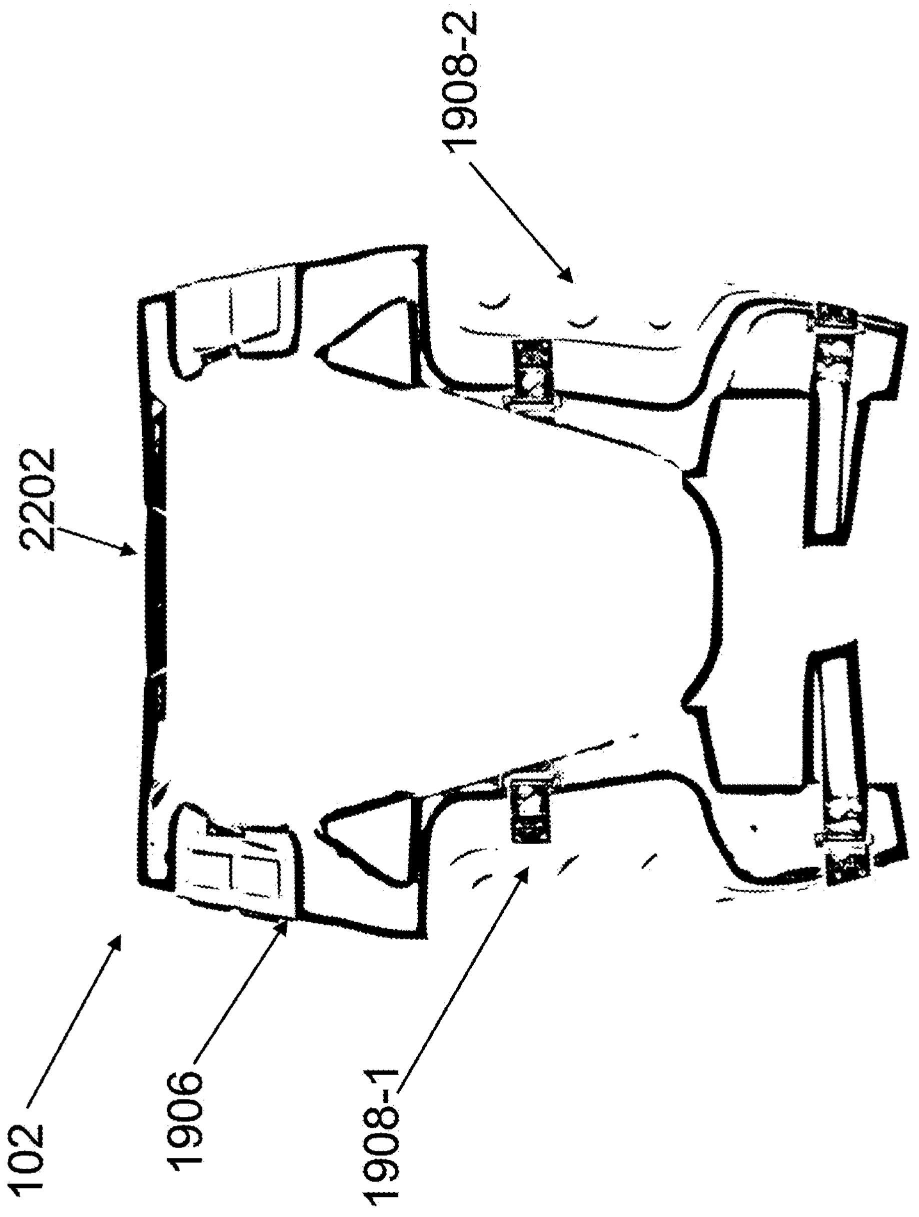
FIG. 22 illustrates different views of a first part of the lower body protector, according to an embodiment of the present disclosure.
Figure 22B:
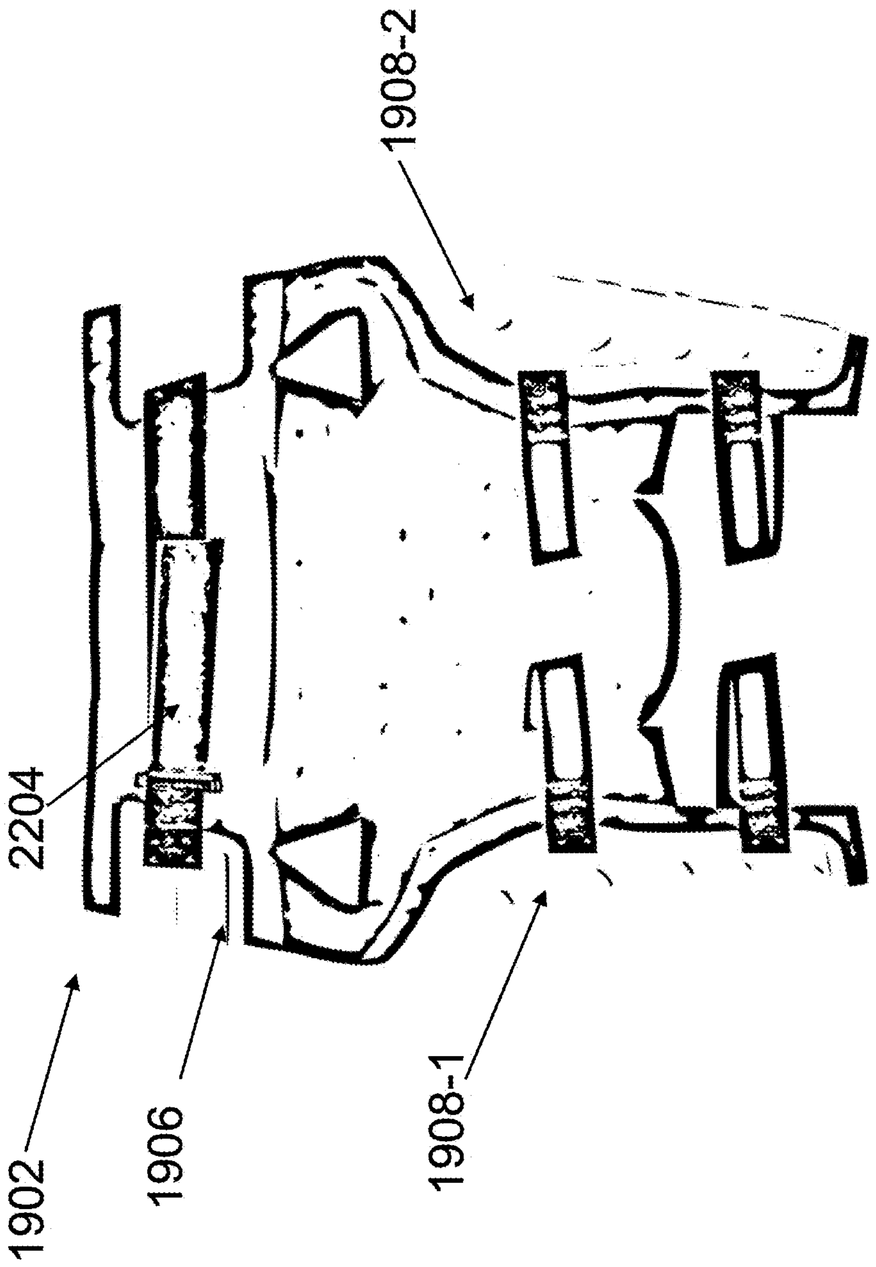

FIG. 22 illustrates different views of the first part 1902, according to an embodiment of the present disclosure. In particular, FIG. 22A illustrates a front view of the first part 1902, according to an embodiment of the present disclosure. In particular, FIG. 22B illustrates a rear view of the first part 1902, according to an embodiment of the present disclosure.

Referring to FIG. 19, FIG. 20, FIG. 21, and FIG. 22, the first part 1902 may include, but is not limited to, a protective belt 1906, at least one thigh guard 1908 removably coupled to the protective belt 1906, a groin guard 2202 removably coupled with the protective belt 1906 and the at least one thigh guard 1908, and at least one hip plastic shield (shown in FIG. 25) adapted to be stitched on the protective belt 1906. In particular, the first part 1902 may include a pair of thigh guards 1908, individually referred to as the thigh guard 1908-1 and the thigh guard 1908-2.

As the name suggests, the protective belt 1906 may be adapted to cover a waist region of the user. The at least one thigh guard 1908 may be adapted to protect a thigh of the user. The groin guard 2202 may be adapted to protect a groin region of the user. Further, the at least one hip plastic shield may be adapted to protect a hip region of the user.

In an embodiment, the protective belt 1906 may include, but is not limited to, a bi-directional clip buckle 2204 adapted to adjust dimensions of the protective belt 1906 based on waist dimensions of the user. Therefore, the bi-directional clip buckle 2204 may allow the user to adjust the waist of the protective belt 1906 in order to ensure it appropriately fits the user. In an embodiment, the protective belt 1906 may also include a Velcro strap adapted to attach to an engaging member of a torso protection gear (not shown).

In an embodiment, the protective belt 1906 may be coupled to the at least one thigh guard 1908 by means of foam paddings. In an embodiment, a foam padding of the protective belt 1906 may be coupled with a foam padding of the at least one thigh guard 1908. In an embodiment, a foam padding of the protective belt 1906 may have a female Velcro part stitched on it dorsally. Further, the foam padding of the at least one thigh guard 1908 may have a corresponding male Velcro part stitched on it. The male part may be coupled with the female part to secure a connection between the protective belt 1906 and the at least one thigh guard 1908. In another embodiment, the protective belt 1906 may be coupled with the at least one thigh guard 1908 by an adjustable Velcro loop fastener to cater to the requirement of users with different dimensional characteristics of legs. Therefore, there are multiple ways of attaching the protective belt 1906 with the at least one thigh guard 1908.

Further, the groin guard 2202 may be removably coupled with the protective belt 1906 and the at least one thigh guard 1908. The groin guard 2202 may be formed of heavily padded foam padding in order to minimize any kind of impact without hampering the comfort of the user.

Therefore, the first part 1902 may be adapted to cover the entirety of pelvic region by the protective belt 1906, along with the upper leg region extending from the anterior to the posterior of the femur containing mass of a leg of the user. In an embodiment, edges of the first part 1902 may be convex bent.

Figure 23:
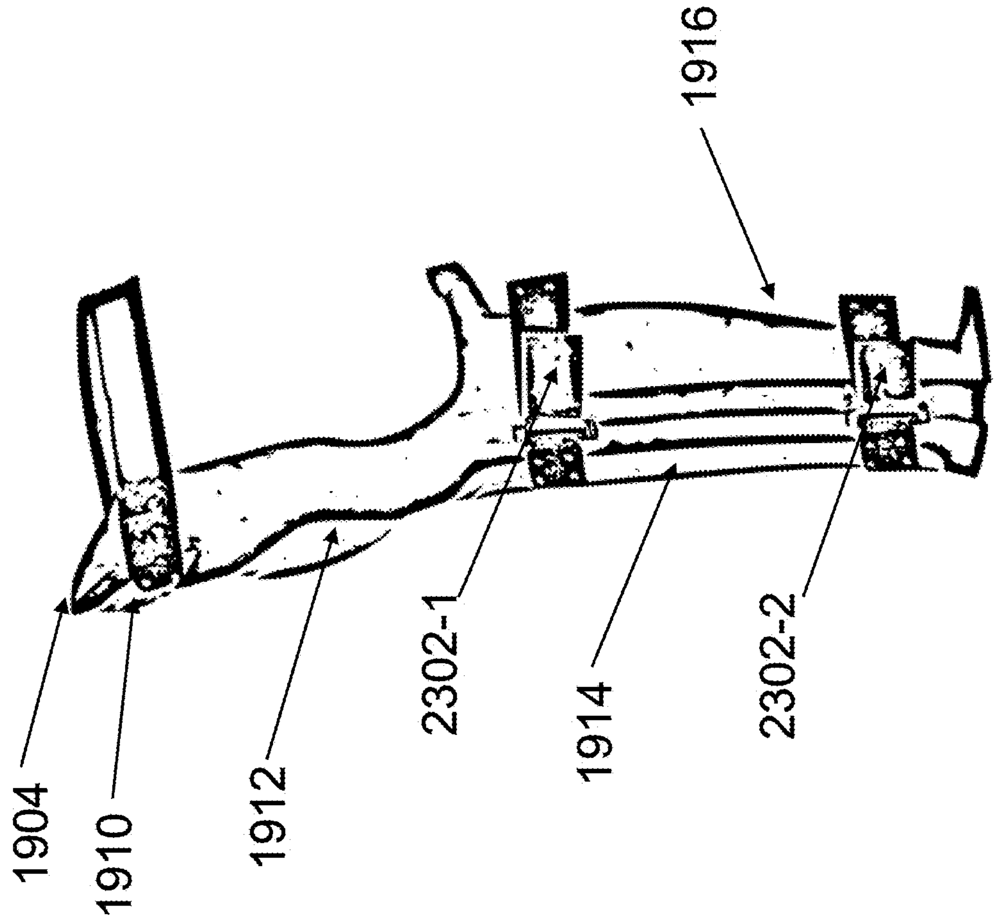
FIG. 23 illustrates a side view of a second part of the lower body protector, according to an embodiment of the present disclosure.
Figure 24A:
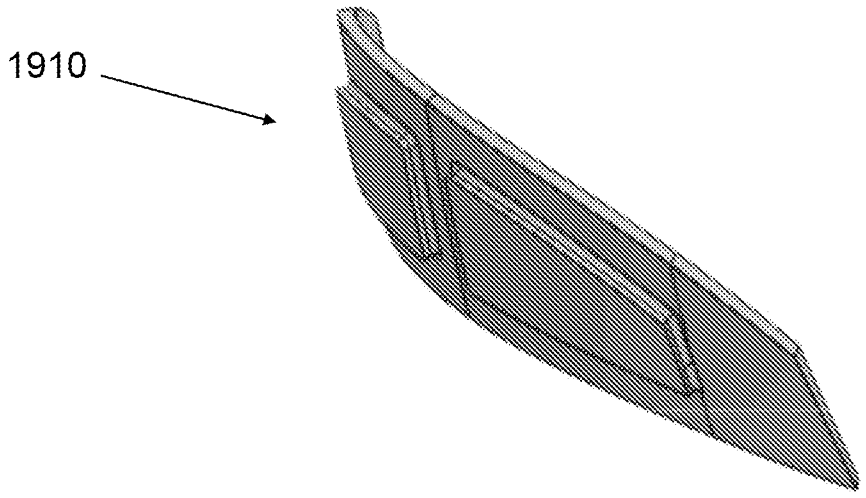
FIG. 24 illustrates perspective views of components of the second part of the lower body protector, according to an embodiment of the present disclosure.
Figure 24B:
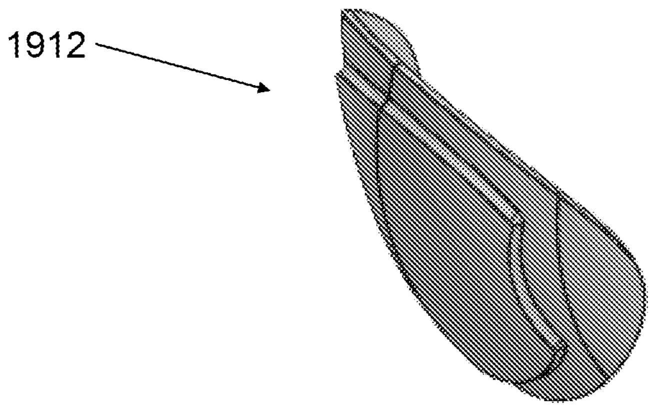
Figure 24C:
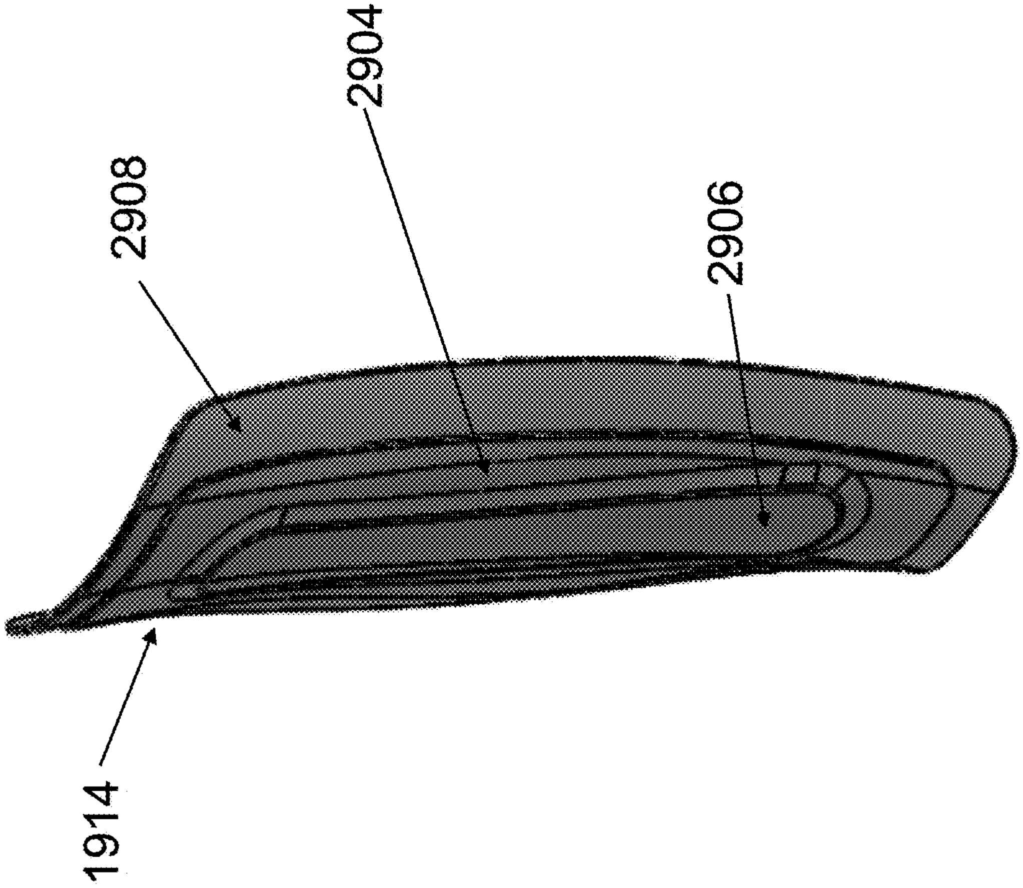
Figure 24D:
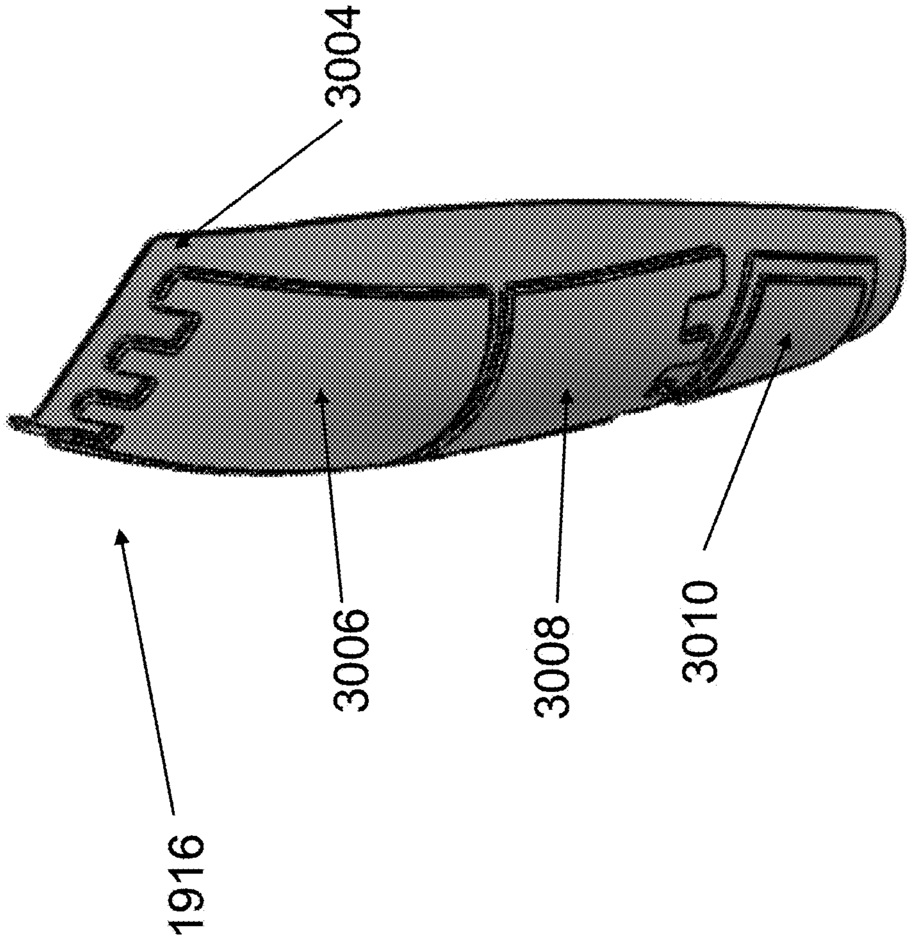

Further, FIG. 23 illustrates a side view of the second part 1904, according to an embodiment of the present disclosure. FIG. 24 illustrates perspective views of components of the second part 1904, according to an embodiment of the present disclosure. Referring to FIG. 19, FIG. 20, FIG. 21, FIG. 23, and FIG. 24, the second part 1904 may include, but is not limited to, at least one upper knee guard 1910, at least one knee guard 1912 removably coupled to the at least one upper knee guard 1910, at least one shin guard 1914 removably coupled to the at least one knee guard 1912, at least one calf guard 1916 removably coupled with the at least shin guard 1914. In particular, the second part 1904 may include an upper knee guard 1910, a knee guard 1912, a shin guard 1914, and a calf guard 1916 for each leg. Therefore, in an embodiment, the lower body protector 1900 may include a pair of upper knee guards, namely, 1910-1 and 1910-2, a pair of knee guards 1912, namely, 1912-1 and 1912-2, a pair of shin guards, namely, 1914-1 and 1914-2, a pair of calf guards, namely, 1916-1 and 1916-2.

In an embodiment, the at least one upper knee guard 1910 may be adapted to cover an upper knee region of the user. The at least one knee guard 1912 may be adapted to cover a knee of the user. The at least one shin guard 1914 may be adapted to cover a shin of the user. Similarly, the at least one calf guard 1916 may be adapted to cover a calf of the user. In an embodiment, the at least one upper knee guard 1910, the at least one knee guard 1912, the at least one shin guard 1914 are formed to be convex-bent whereas the at least one calf guard 1916 may be formed to be concave-bent.

In an embodiment, the second part 1904 may include a pair of elastic straps 2302, individually referred to as the elastic strap 2302-1 and the elastic strap 2302-2. The elastic straps 2302 may be stitched on right lateral aspect to join the at least one shin guard 1914 with the at least one calf guard 1916 ensuring ample flexibility. In an embodiment, each of the elastic straps 2302 may have a width of about 4 cm.

Further, in an embodiment, the left lateral aspect between the at least one shin guard 1914 and the at least one calf guard 1916 may be secured by means of three hook-loop fasteners with strap length varying as per a size group of the user. In an embodiment, the at least one knee guard 1912 may be secured to a knee region of the user by a double-wrapped Velcro strap that is adjustable both from popliteal area due to self-adhesive Velcro as well as from the knee region where the male part of Velcro on the strap sticks over the female part of the Velcro stitched over the at least one upper knee guard 1910.

In an embodiment, at least one of the protective belt 1906, the at least one thigh guard 1908, the groin guard 2202, the at least one upper knee guard 1910, the at least one knee guard 1912, the at least one shin guard 1914, and the at least one calf guard 1916 may include a protective plastic shield attached over a foam padding. Further, protective plastic shields may be embossed. In an embodiment, the protective plastic shield may be formed of a combination polymer of a thermoplastic blend of Polycarbonate (PC) and Acrylonitrile Butadiene Styrene (ABS).

In an embodiment, each protective plastic shield may be attached to a corresponding foam padding by at least one of a stitching operation and a riveting operation. In an example, a length of 2 centimetres may be left on each side of a foam padding after the sewing of a protective plastic shield. Therefore, an area covered by the foam padding may be more than an area covered by the protective plastic shield. In an embodiment, the foam padding with variable thickness above and below the at least one knee guard 1912 may be stitched on a suitable fabric, for example, cotton.

In an embodiment, the first part 1902 and the second part 1904 may be formed into a single unit by using Velcro surfaces stitched along the foam padding. A female part of Velcro may be sewn on a dorsal region of the at least one thigh guard 1908, which would eventually be covered by overlapping foam padding of an upper knee shield having a counter male part of Velcro sewn ventrally.

Figure 25:
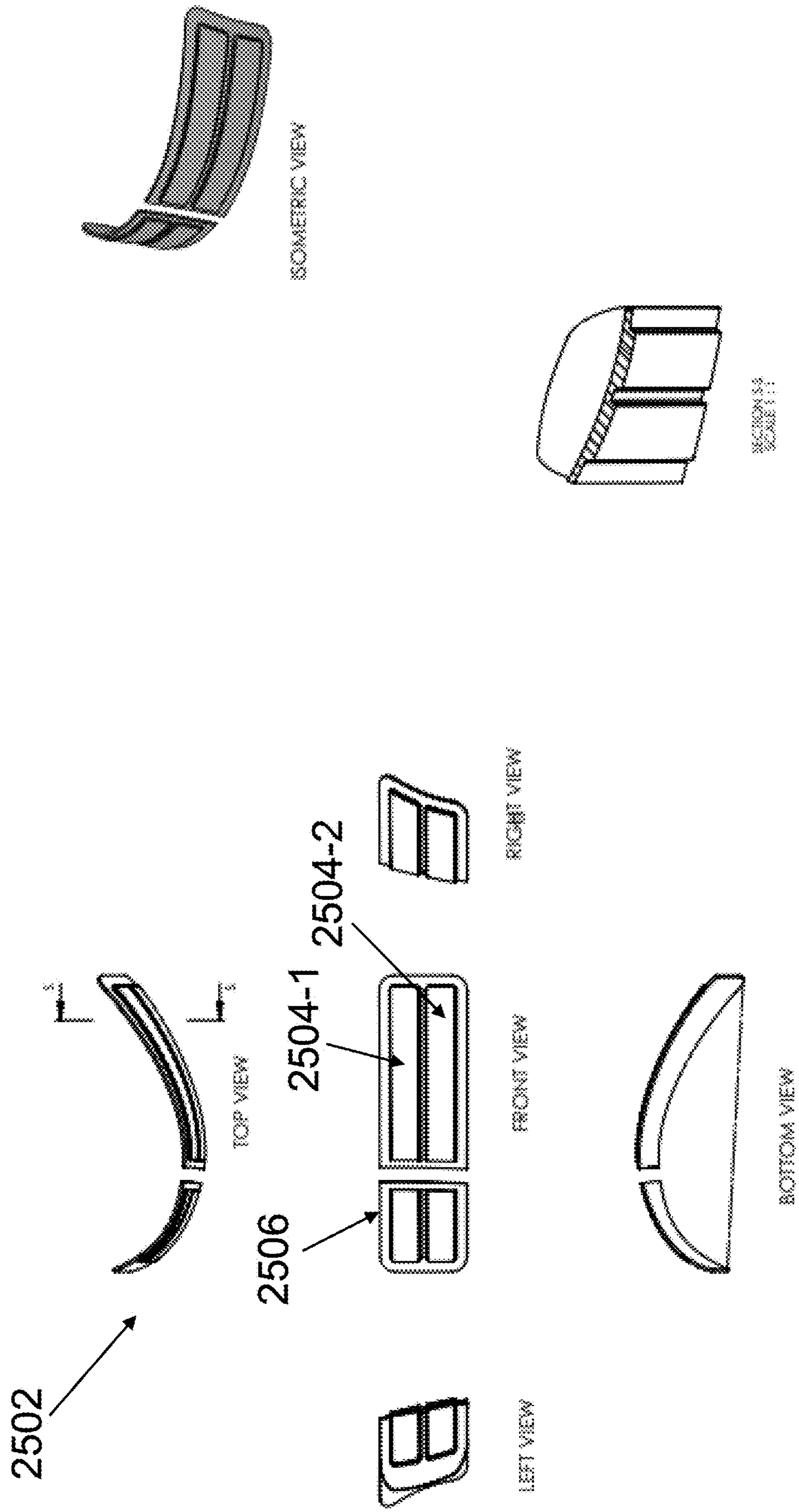
FIG. 25 illustrates different views of a hip plastic shield of the first part of the lower body protector, according to an embodiment of the present disclosure.

FIG. 25 illustrates different views of the hip plastic shield 2502 of the first part 1902, according to an embodiment of the present disclosure. In an embodiment, the protective belt 106 may include a pair of bi-ramified hip plastic shields 2502, one on either lateral side. The hip plastic shield 2502 may be embossed. The embossing may distinctively separate it into further two thinner plates 2504-1 and 2504-2, with units 2504 and 2506 having their surface bent convexly and stitched over the foam padding of the protective belt 1906 over which runs a Velcro strap made belt passing through loops, held and fastened by means of the bidirectional adjustable clip buckle 2204. In an embodiment, the hip plastic shield 2502 may have a variable thickness.

In an embodiment, the hip plastic shield 2502 may be adapted to be stitched on the protective belt 1906. In uppermost belt region, adjustability is provided by means of the bidirectional adjustable clip buckle 2204, where the user can adjust the belt from either side that is further held by loops accommodating it on the entire upper leg protector assembly and sticks on dorsal aspect of the surface beneath by means of a Velcro surface. In an embodiment, the protective belt 1906 bears the property for being associated to any torso protecting gear by means of a sticky Velcro strap located in the middle of the dorsal part of the waist.

Figure 26:
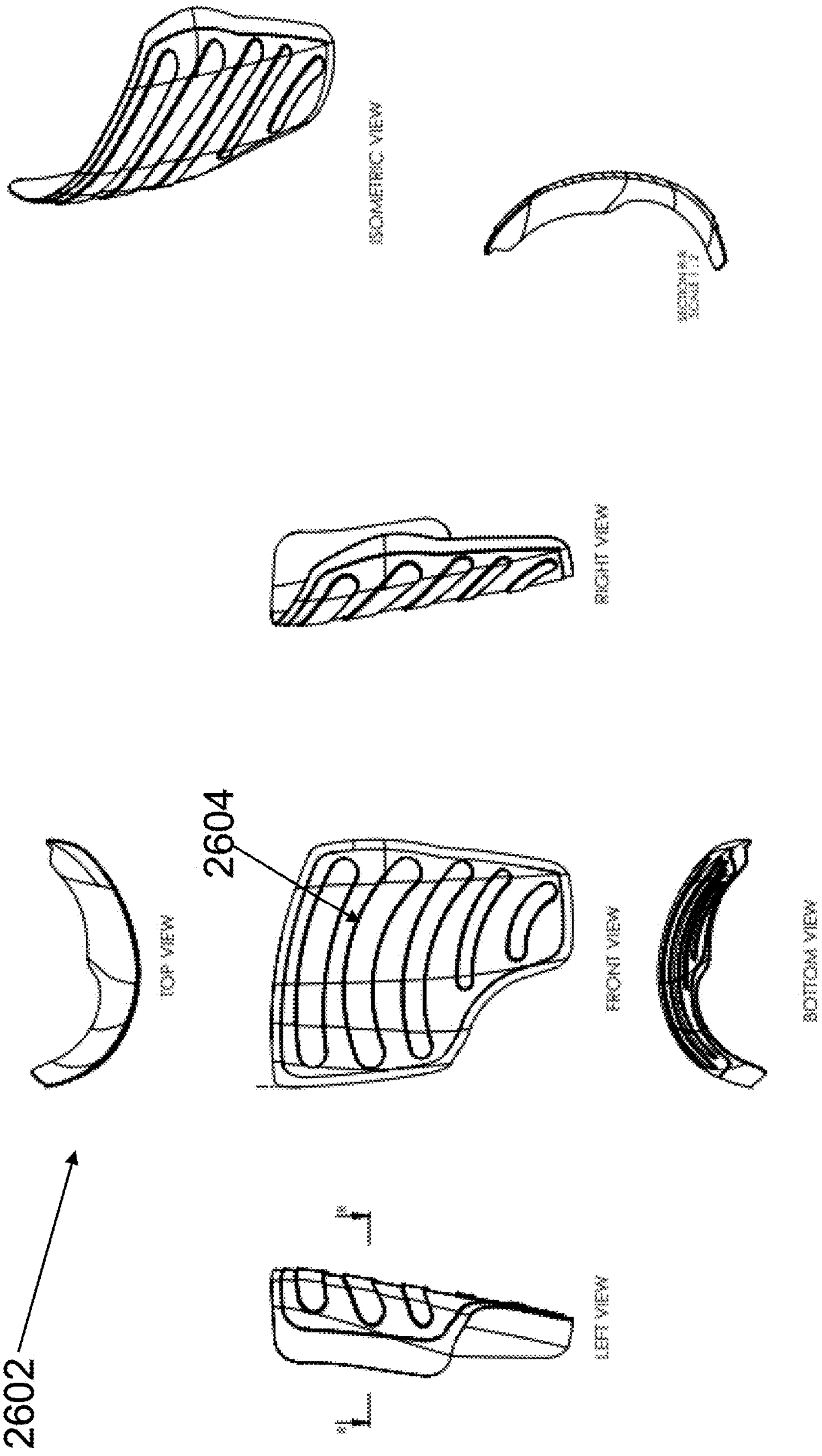
FIG. 26 illustrates different views of a thigh plastic shield of the first part of the lower body protector, according to an embodiment of the present disclosure.

FIG. 26 illustrates different views of a thigh plastic shield 2602 of the first part 1902, according to an embodiment of the present disclosure. The thigh plastic shield 2602 may be adapted to be stitched on the foam padding of the at least one thigh guard 1908. For wearing and adjusting the at least one thigh guard 1908, the lower body protector 1900 may include an elastic strap, for example, having a width of about 10 cm, with the hoop side that is rough and hard and called male part of Velcro stitched on its ventral aspect that sticks upon the loop side that is fuzzy and soft and called female part of Velcro that is stitched on the thigh plastic shield 2602.

As depicted by the various views in the given figure, the thigh plastic shield 2602 appears C-shaped when seen from top and bottom, due to the convex bent given to it so as to fit on the thigh of the user. The embossing as depicted by 2602, on edges in form of waves is aimed to provide maximum protection to the thigh region by deflecting the projectile and minimising the impact of the same upon collision. Further, curved shape of the thigh plastic shield 2602 allows for comfortable fitting on the thigh of the user, with ample comfort and no hindrance to manoeuvrability of the user.

Figure 27:
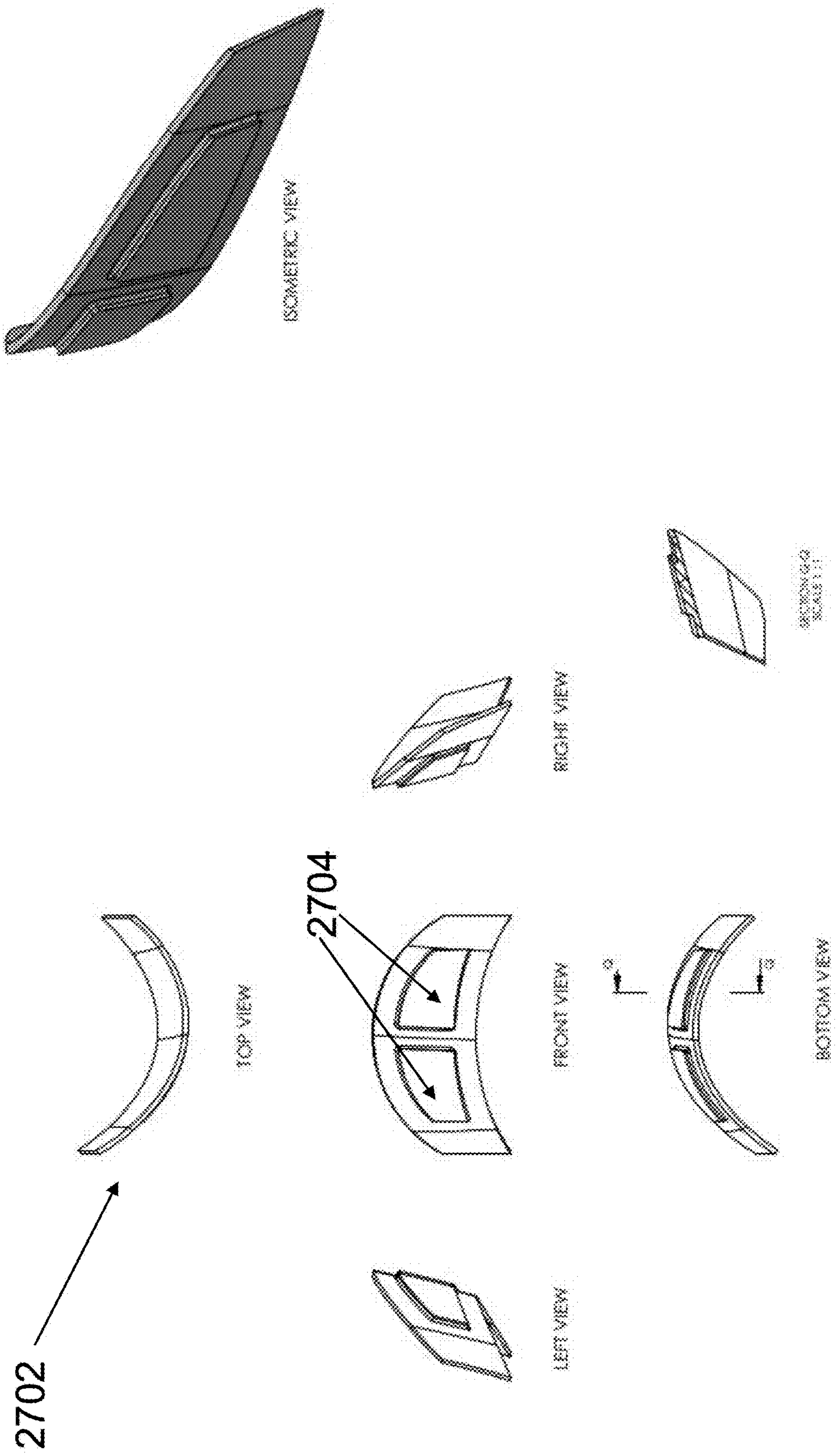
FIG. 27 illustrates different views of a knee upper plastic shield of the second part of the lower body protector, according to an embodiment of the present disclosure.

FIG. 27 illustrates different views of an upper knee plastic shield 2702 of the second part 1904, according to an embodiment of the present disclosure. As shown in the top view and the bottom view, the upper knee plastic shield 2702 is bent convexly, to appear as a C-shaped plate, with two embossings 2704. In an example, each of the embossings 2704 may make the upper knee plastic shield 2702 4 mm thick at places of their existence. Otherwise, the thickness of the upper knee plastic shield 2702 may be about 2 mm. The upper knee plastic shield 2702 may be stitched over the foam padding.

Figure 28:
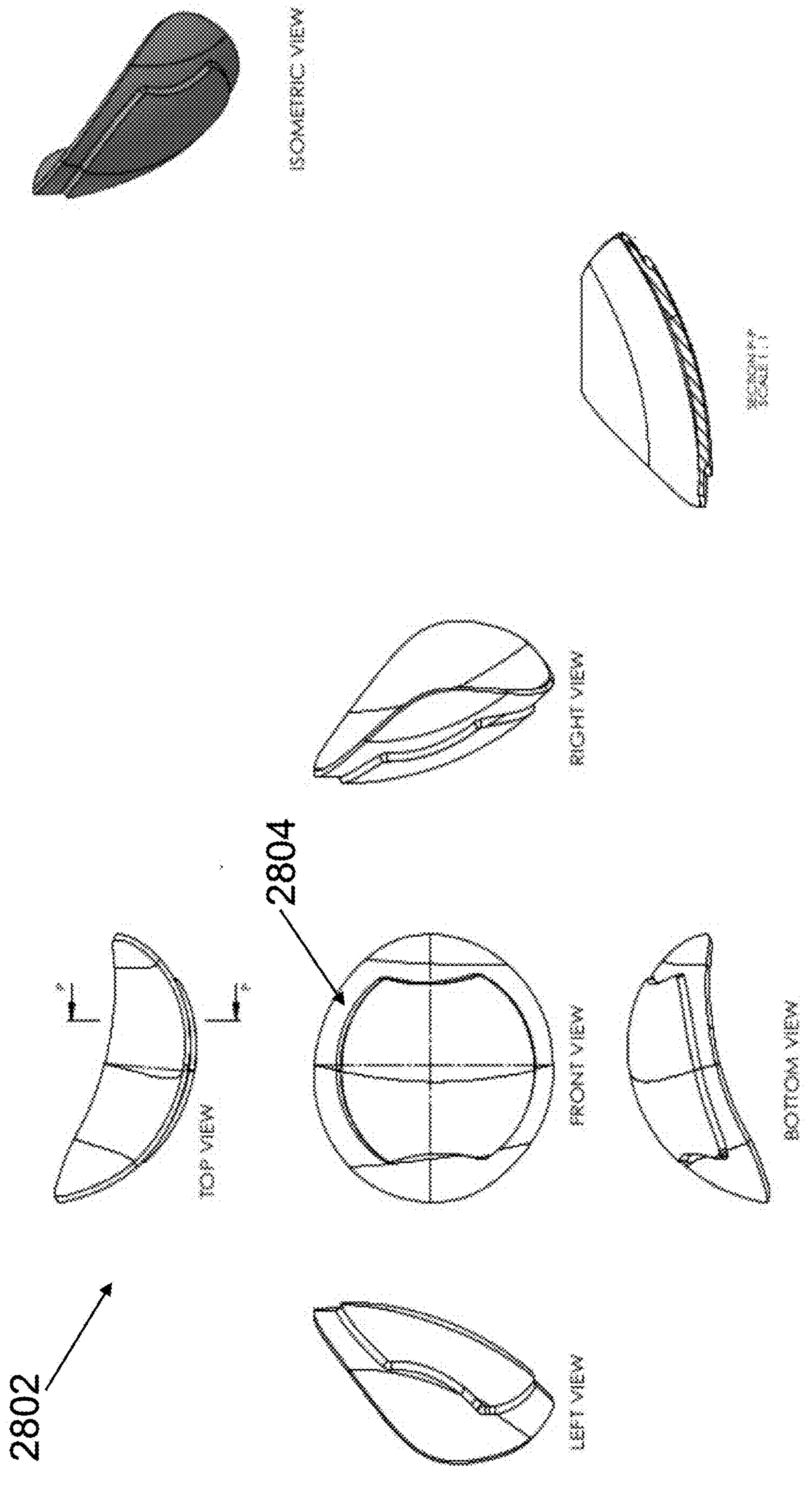
FIG. 28 illustrates different views of a knee covering plastic shield of the second part of the lower body protector, according to an embodiment of the present disclosure.

FIG. 28 illustrates different views of a knee covering plastic shield 2802 of the second part 1904, according to an embodiment of the present disclosure. The shape of the knee covering plastic shield 2802 may be elliptical as shown in the front view, and may be U-shaped when shown in the top view and the bottom view. The embossing over circular bulged out concavity as indicated by 2804, is selected to impart better protection to the knee joint region, along with a better fit over the knee owing to its shape. Ample adjustability is also given by means of bi-directional Velcro straps. The shape of this part is selected so as to reduce an impact of any object to the knee joint region of the user.

Figure 29:
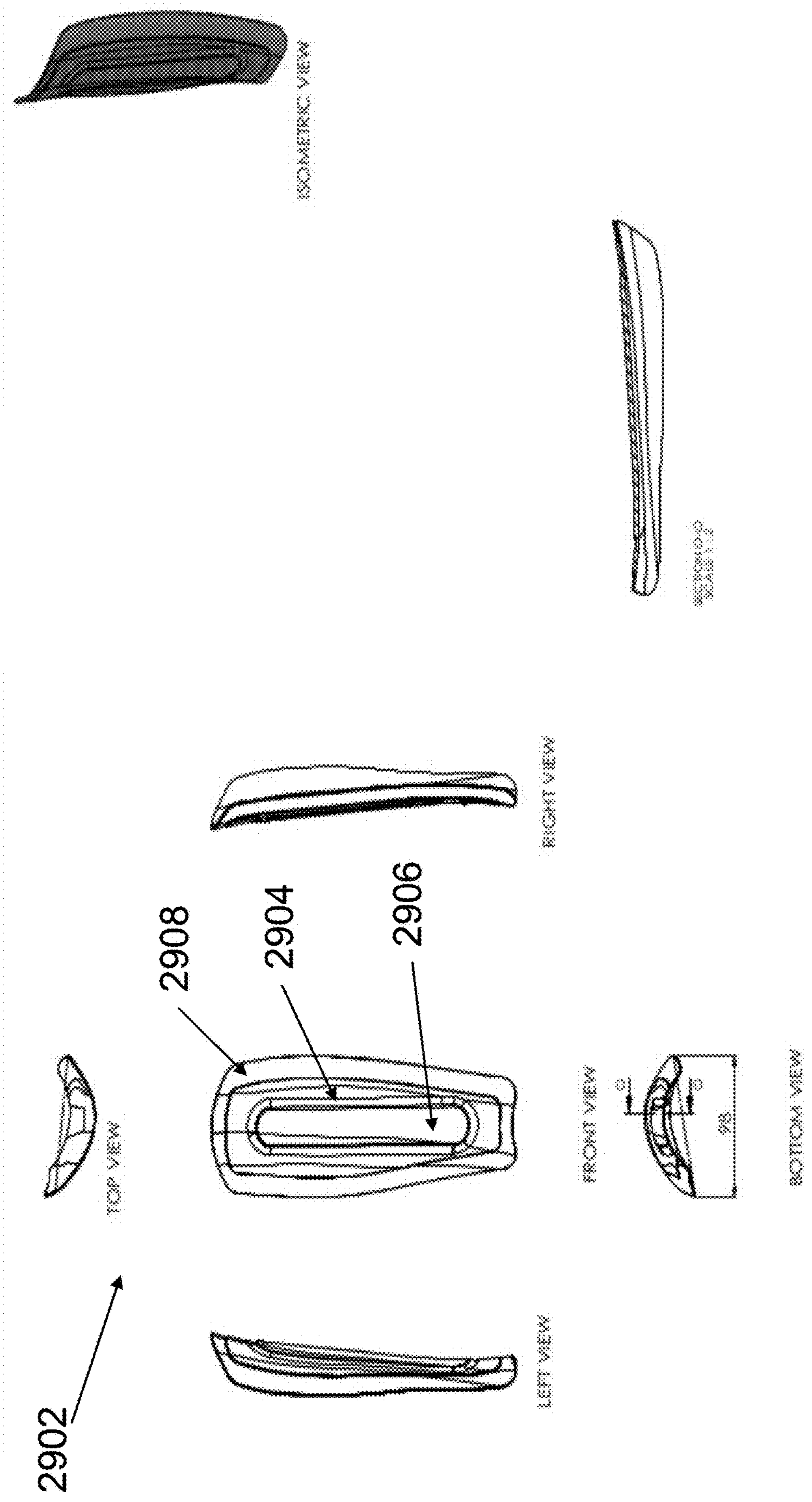
FIG. 29 illustrates different views of a shin guard plastic shield of the second part of the lower body protector, according to an embodiment of the present disclosure.

FIG. 29 illustrates different views of a shin guard plastic shield 2902 of the second part 1904, according to an embodiment of the present disclosure. The shin guard plastic shield 2902 is an elongated shield with dual overlapping embossing, 2904 and 2906. A basal layer 2908 may be provided with a thickness of about 2 mm at edges, and a thickness of 4 mm at each successive embossings. The shin guard plastic shield 2902 may be stitched or riveted over the foam padding based on user requirements. Further, the shin guard plastic shield 2902 may be fastened to the at least one calf guard 1916 on one lateral side by means of Velcro hook and loop fasteners, while an stretchable attachment with elastic straps on the other lateral side.

Figure 30:
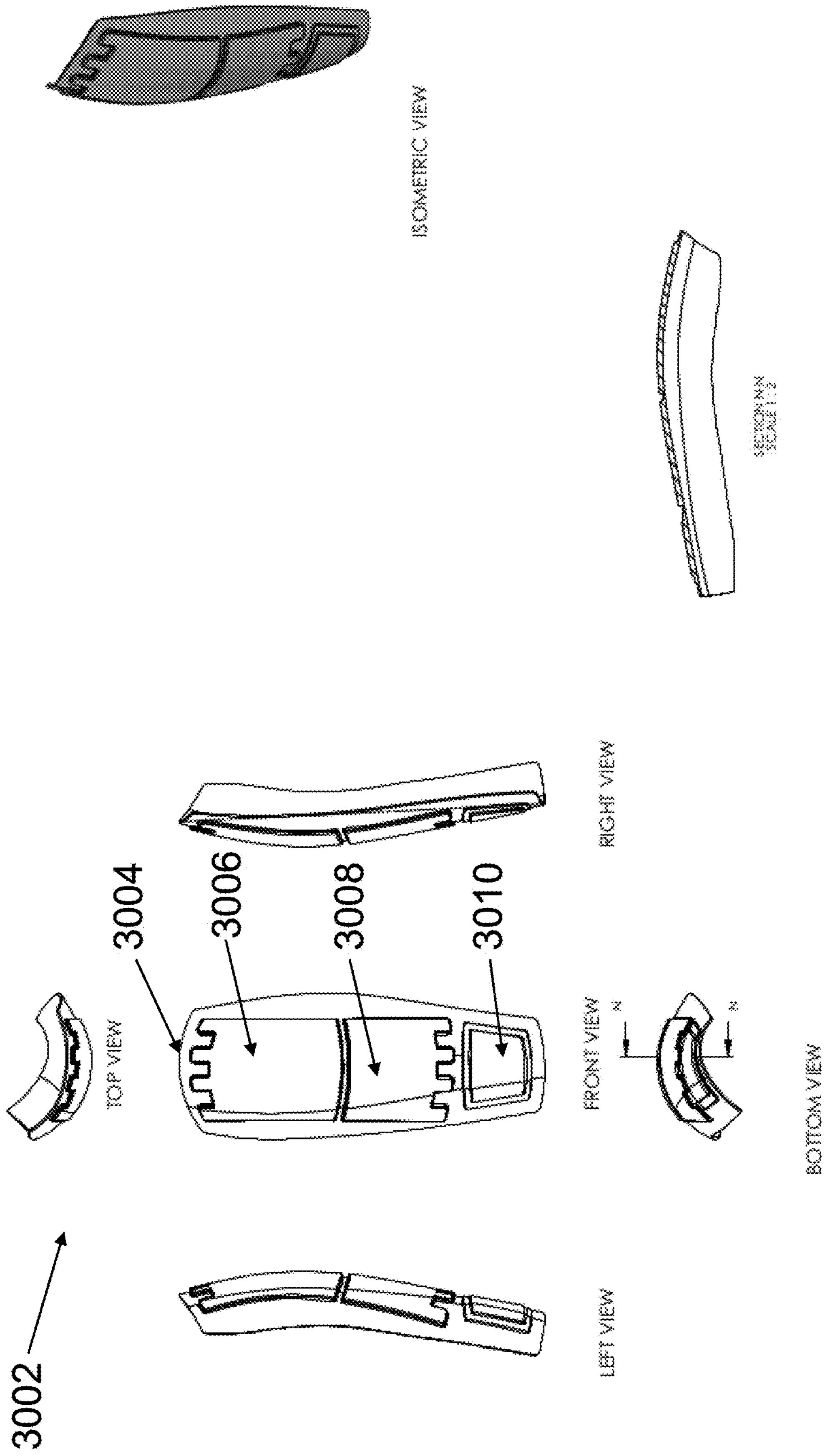
FIG. 30 illustrates different views of a calf guard plastic shield of the second part of the lower body protector, according to an embodiment of the present disclosure.

FIG. 30 illustrates different views of a calf guard plastic shield 3002 of the second part 1904, according to an embodiment of the present disclosure. The calf guard plastic shield 3002 may include a basal plate 3004 having a thickness of about 2 mm and is bent convexly (left and right view) and succeeded by three embossing 3006, 3008, and 3010, each increasing the thickness of the calf guard plastic shield 3002 by 2 mm and therefore, making it 4 mm thick at the place of the occurrence of the respective embossing. As shown in the front view, the embossing 3006 and 3008 may form a shape of an arc rectangular with serrated margins at anteriority of first and posterior of second, and smooth margins being present at rest of the sides. Further, the embossing 3010 may be formed in the proximity of an ankle joint of the user. The shape of the calf guard plastic shield 3002 is selected so as to reduce an impact of any object to the calf region of the user. The calf guard plastic shield 3002 may be stitched or riveted over the foam padding based on user requirements. The calf guard plastic shield 3002 may be fastened to the at least one shin guard 1914 on one lateral side by means of Velcro hook and loop fasteners, while an stretchable attachment with elastic straps on the other lateral side.

As would be gathered, the present disclosure offers an ergonomically designed protection gear for protecting the entire body of the users. Particularly, the present invention provides an integrated protective gear for protecting torso for a female wearer that is compact by virtue of the design of the integrated protective gear. The torso protector delivers better fit and protection to the female wearer with easy to wear mechanism and user-friendly design (i.e., the convex shape or curved lens shape of the various shields) with negligible manoeuvrability hindrance. The torso protector is also ergonomically designed in order to achieve an improved torso protector for the female wearer.

Further, the present disclosure offers an ergonomically designed protective gear for protecting arms of the users. The arm protector 1300 extends from lateral edges of shoulders, and covers the upper arm region just before the elbow (first part 1302), the elbow, and the forearm (second part 1304). Further, the arm protector 1300 includes the foam padding placed under the shielding plates and optimally associated with flaps accommodating adjustability of fit by means of the Velcro straps on the ventral aspect of the arms.

The arm protector 1300 is a compact gear which ensures protection from any kind of potential injury to the arms. The arm protector 1300 is adjustable allowing the application to people with different body sizes. The arm protector 1300 is designed in such a manner that it doesn't restrict any movement of the arm while ensuring complete protection as well. Further, the arm protector 1300 is provided in different sizes, for example, "Small", "Medium", and "Large" for people with different body sizes.

The arm protector 1300 is comfortable to wear and allows required maneuverability in action. Further, the material forming the arm protector 1300 may vary, based on requirements and applications of the arm protector 1300.

Moreover, the lower body protector 1900 extends from the waist and covers the entire lower body of the user. Further, the lower body protector 1900 includes the foam padding placed under the shielding plates and optimally associated with flaps accommodating adjustability of fit by means of the Velcro straps.

The lower body protector 1900 is a compact gear which ensures protection from any kind of potential injury to the lower body. The lower body protector 1900 is adjustable allowing the application to people with different body sizes. The lower body protector 1900 is designed in such a manner that it doesn't restrict any movement of the arm while ensuring complete protection as well. Further, the lower body protector 1900 is adjustable for different sizes, for example, "Small", "Medium", and "Large" for people with different body sizes.

The lower body protector 1900 is comfortable to wear and allows required maneuverability in action. Further, the material forming the arm protector 1900 may vary, based on requirements and applications of the arm protector 1900. Therefore, the present disclosure offers the full-body protection gear 100 that is adjustable, compact, light-weight, sturdy, flexible, easy-to-wear, comfortable, safe, and cost-effective.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A full-body protection gear comprising:

a torso protector for protecting torso of a wearer, the torso protector comprising:

a protective vest defining a neck opening, a first arm opening, and a second arm opening;

a front shield fixedly disposed on the protective vest;

a back shield fixedly disposed on the protective vest and adapted to form a convex shaped structure for protecting a back of the wearer;

a first pair of side shields fixedly disposed on the protective vest and adapted to form a convex shaped rectangular structure for protecting lower left abdomen of the wearer;

a second pair of side shields fixedly disposed on the protective vest and adapted to form a convex shaped rectangular structure for protecting lower right abdomen of the wearer;

a first shoulder shield fixedly disposed on the protective vest, and adapted to form an elongated convex structure with curved edges for protecting left shoulder of the wearer; and a second shoulder shield fixedly disposed on the protective vest and adapted to form an elongated convex structure with curved edges for protecting right shoulder of the wearer;

at least one arm protector comprising:

a first part adapted to cover an upper arm region of a user extending from a shoulder to an elbow; and a second part adapted to be removably coupled with the first part and to cover a lower arm region of the user extending from the elbow to a palm; and a lower body protector comprising:

a first part adapted to cover pelvic region and an upper leg region of a user;

a second part removably coupled with the first part in a partial overlapping manner, and adapted to cover lower leg region of the user, wherein the lower leg region is indicative of a region extending from above a knee joint to above an ankle joint of the user.

2. A compact integrated protective gear for protecting torso of a wearer, the compact integrated protective gear comprising:

a protective vest defining a neck opening, a first arm opening, and a second arm opening and comprising:

a front panel;

a rear panel integrated with the front panel to cover a front portion, a back portion and a substantial portion of shoulders of the wearer;

a first set of lower side panels extending from the front panel; and a second set of lower side panels extending from the rear panel, such that the first set of lower side panels is removably attached with the second set of lower side panels to cover a lower left abdomen and lower right abdomen of the wearer;

a front shield fixedly disposed the front panel, the front shield including:

an upper portion adapted to form a convex shaped structure for protecting a chest of the wearer; and a lower portion adapted to form an elongated horizontal structure bearing a curved lens shape for protecting an abdomen of the wearer;

a back shield fixedly disposed on the rear panel and adapted to form a convex shaped structure for protecting a back of the wearer;

a first pair of side shields fixedly disposed on the first set of lower side panels and adapted to form a convex shaped rectangular structure for protecting lower left abdomen of the wearer;

a second pair of side shields fixedly disposed on the first set of lower side panels and adapted to form a convex shaped rectangular structure for protecting lower right abdomen of the wearer;

a first shoulder shield fixedly disposed on the front panel and the rear panel, and adapted to form an elongated convex structure with curved edges for protecting left shoulder of the wearer; and a second shoulder shield fixedly disposed on the front panel and the rear panel, and adapted to form an elongated convex structure with curved edges for protecting right shoulder of the wearer.

3. The torso protector as claimed in claim 2, wherein the front panel and the rear panel comprises a plurality of foams pads arranged successively between a first layer of textile material and a second layer of the textile material, and wherein an area of the plurality of foams pads is larger than an area of each of the front shield, the back shield, the first pair of side shields, the second pair of side shields, the first shoulder shield, and the second shoulder shield.

4. The torso protector as claimed in claim 2, wherein the convex shaped structure of the back shield aligns with curvature of the back of the wearer.

5. The torso protector as claimed in claim 2, wherein:

the upper portion of the front shield is formed by embossing a plurality of sheets placed one over another, a dimension of each of the plurality of sheets increases from inside to outside; and the lower portion of the front shield, the back shield, the first pair of side shields, the second pair of side shields, the first shoulder shield, and the second shoulder shield formed by embossing the plurality of sheets placed one over another, wherein the upper portion of the front shield, the lower portion of the front shield, the back shield, the first pair of side shields, the second pair of side shields, the first shoulder shield, and the second shoulder shield have a variable range of thickness form 2 mm to 4 mm.

6. The torso protector as claimed in claim 2, wherein the lower portion of the front shield, the back shield, the first pair of side shields, the second pair of side shields, the first shoulder shield, and the second shoulder shield comprises a plurality of embossed patterns.

7. The torso protector as claimed in claim 2, wherein the pair of side shields are connected to the lower part of the front shield and back shield through fasteners, and wherein the pair of shoulder shields are connected to the upper part of the front shield and back shield through fasteners.

8. An arm protector comprising:

a first part adapted to cover an upper arm region of a user extending from a shoulder to an elbow, the first part comprising:

a first foam padding facing the arm; and a pair of first shielding plates attached to the first foam padding, wherein the pair of first shielding plates is embossed and has a variable thickness; and a second part adapted to be removably coupled with the first part and to cover a lower arm region of the user extending from the elbow to a palm, the second part comprising:

a dorsal protector facing outside and formed by a second foam padding and at least one second shielding plate attached to the second foam padding, wherein the dorsal protector is extendable to cover the elbow; and a ventral protector facing towards the arm and attached to the dorsal protector at one end, wherein the ventral protector is formed of a third foam padding and at least one third shielding plate attached to the third foam padding.

9. The arm protector as claimed in claim 8, further comprising a shoulder pad adapted to be coupled to the first part and to cover the shoulder, wherein the shoulder pad is coupled to the first part with at least one snap fastener and is formed by a fourth foam padding facing the shoulder and at least one fourth shielding plate having variable thickness attached to the fourth foam padding.

10. The arm protector as claimed in claim 8, wherein the second part is adapted to overlap the first part, when the arm of the user is straightened.

11. The arm protector as claimed in claim 9, wherein the pair of first shielding plates, the at least one second shielding plate, the at least one third shielding plate, and the at least one fourth shielding plate are formed of one of a hard plastic material and a combination polymer of a thermoplastic blend of Polycarbonate (PC) and Acrylonitrile Butadiene Styrene (ABS).

12. The arm protector as claimed in claim 8, wherein the dorsal protector and the ventral protector are secured on the arm by at least one Velcro strap.

13. The arm protector as claimed in claim 8, wherein the pair of first shielding plates has a variable thickness ranging from 2 mm to 4 mm.

14. The arm protector as claimed in claim 8, wherein edges of the first part are convex bent and edges of the ventral protector are concave bent.

15. A lower body protector comprising:

a first part adapted to cover pelvic region and an upper leg region of a user, the first part comprising:

a protective belt adapted to cover a waist region of the user;

at least one thigh guard removably coupled to the protective belt and adapted to the protect a thigh of the user;

a groin guard removable coupled with the protective belt and the at least one thigh guard, and adapted to protect a groin region of the user; and at least one hip plastic shield adapted to be stitched on the protective belt and adapted to protect a hip region of the user, wherein the at least one hip plastic shield is embossed and has a variable thickness; and a second part removably coupled with the first part in a partial overlapping manner, and adapted to cover lower leg region of the user, wherein the lower leg region is indicative of a region extending from above a knee joint to above an ankle joint of the user, the second part comprising:

at least one upper knee guard adapted to cover an upper knee region of the user;

at least one knee guard removably coupled to the at least one upper knee guard and adapted to cover a knee of the user;

at least one shin guard removably coupled to the at least one knee guard and adapted to cover a shin of the user; and at least one calf guard removably coupled with the at least one shin guard and adapted to cover a calf of the user, wherein at least one of the protective belt, the at least one thigh guard, the groin guard, the at least one upper knee guard, the at least one knee guard, the at least one shin guard, and the at least one calf guard comprises a protective plastic shield attached over a foam padding, and protective plastic shields are embossed.

16. The lower body protector as claimed in claim 15, wherein the second part is removably coupled to the first part at least by a Velcro attachment mechanism and in such a manner that an upper portion of the second part is adapted to overlap a lower portion of the first part, when a leg of the user is straightened.

17. The lower body protector as claimed in claim 15, wherein the protective belt comprises a bi-directional clip buckle adapted to adjust dimensions of the protective belt based on waist dimensions of the user and a Velcro strap adapted to attach to an engaging member of a torso protection gear.

18. The lower body protector as claimed in claim 15, wherein the at least one thigh guard is removably coupled with the protective belt either by stitching of respective foam paddings or by an adjustable Velcro loop fastener mechanism.

19. The lower body protector as claimed in claim 15, wherein the at least one upper knee guard, the at least one knee guard, and the at least one shin guard are formed to be convex-bent, and the at least one calf guard is formed to be concave-bent.

20. The lower body protector as claimed in claim 15, wherein each protective plastic shield is attached to a corresponding foam padding by at least one of stitching and riveting, and is formed of a combination polymer of a thermoplastic blend of Polycarbonate (PC) and Acrylonitrile Butadiene Styrene (ABS).

* * * * *